United States Patent
Bye et al.

(10) Patent No.: US 9,161,227 B1
(45) Date of Patent: Oct. 13, 2015

(54) TRUSTED SIGNALING IN LONG TERM EVOLUTION (LTE) 4G WIRELESS COMMUNICATION

(71) Applicant: Sprint Communications Company L.P., Overland Park, KS (US)

(72) Inventors: Stephen J. Bye, Atlanta, GA (US); Lyle W. Paczkowski, Mission Hills, KS (US); William M. Parsel, Overland Park, KS (US); Matthew C. Schlesener, Shawnee, KS (US); Trevor D. Shipley, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 185 days.

(21) Appl. No.: 13/762,319

(22) Filed: Feb. 7, 2013

(51) Int. Cl.
*H04M 3/16* (2006.01)
*H04W 12/08* (2009.01)

(52) U.S. Cl.
CPC ..................................... *H04W 12/08* (2013.01)

(58) Field of Classification Search
USPC ........... 455/428, 432.1, 433, 435.1, 436, 439, 455/442, 444; 370/328, 334
See application file for complete search history.

(56) References Cited

U.S. PATENT DOCUMENTS

| | | | |
|---|---|---|---|
| 5,303,378 A | 4/1994 | Cohen | |
| 5,321,735 A | 6/1994 | Breeden et al. | |
| 5,764,889 A | 6/1998 | Ault et al. | |
| 5,796,952 A | 8/1998 | Davis et al. | |
| 6,131,024 A | 10/2000 | Boltz | |
| 6,177,860 B1 | 1/2001 | Cromer et al. | |
| 6,219,712 B1 | 4/2001 | Mann et al. | |
| 6,363,150 B1 | 3/2002 | Bhagavath et al. | |
| 6,477,180 B1 | 11/2002 | Aggarwal et al. | |
| 6,507,904 B1 | 1/2003 | Ellison et al. | |
| 6,614,893 B1 | 9/2003 | Paiz | |
| 6,668,322 B1 | 12/2003 | Wood et al. | |
| 6,691,230 B1 | 2/2004 | Bardon | |
| 6,754,784 B1 | 6/2004 | North et al. | |
| 6,823,454 B1 | 11/2004 | Hind et al. | |

(Continued)

FOREIGN PATENT DOCUMENTS

| | | |
|---|---|---|
| WO | WO2011025433 A1 | 3/2011 |
| WO | WO2012064171 A1 | 5/2012 |

(Continued)

OTHER PUBLICATIONS

Notice of Allowance dated Nov. 29, 2013, U.S. Appl. No. 13/440,980, filed on Apr. 5, 2012 (IDF 7971 [4300-14600]).

(Continued)

*Primary Examiner* — Dai A Phuong

(57) ABSTRACT

A system for providing a trusted bearer communication link in a long term evolution (LTE) wireless network. The system attaches a mobile communication device to the long term wireless network. An enhanced node B processes a trust zone request from the mobile communication device. The enhanced node B processes a trust zone service request from the mobile communication device. The enhanced node B interworks with a home subscription server (HSS) and a policy control rules function (PCRF) server to verity the mobile communication device has a right to execute the requested trusted network service. The system established a trusted bearer communication link between the mobile communication device and the long term evolution wireless network.

20 Claims, 13 Drawing Sheets

(56) References Cited

U.S. PATENT DOCUMENTS

| | | |
|---|---|---|
| 6,824,064 B2 | 11/2004 | Guthery et al. |
| 6,895,234 B1 | 5/2005 | Laursen et al. |
| 7,043,241 B1 | 5/2006 | Sladek et al. |
| 7,366,806 B2 | 4/2008 | Milenkovic et al. |
| 7,387,240 B2 | 6/2008 | Ziegler |
| 7,519,824 B1 | 4/2009 | Peyravian et al. |
| 7,552,467 B2 | 6/2009 | Lindsay |
| 7,571,364 B2 | 8/2009 | Whetsel |
| 7,650,645 B1 | 1/2010 | Langendorf et al. |
| 7,716,720 B1 | 5/2010 | Marek et al. |
| 7,873,837 B1 | 1/2011 | Lee et al. |
| 7,895,642 B1 | 2/2011 | Larson et al. |
| 7,921,303 B2 | 4/2011 | Mauro, II |
| 8,060,449 B1 | 11/2011 | Zhu |
| 8,073,428 B2 | 12/2011 | Khetawat et al. |
| 8,086,238 B1 | 12/2011 | Kosar |
| 8,112,794 B2 | 2/2012 | Little et al. |
| 8,190,919 B1 | 5/2012 | Natarajan et al. |
| 8,204,480 B1 | 6/2012 | Lindteigen et al. |
| 8,238,823 B2 | 8/2012 | Maugars et al. |
| 8,271,336 B2 | 9/2012 | Mikurak |
| 8,316,237 B1 | 11/2012 | Felsher et al. |
| 8,402,543 B1 | 3/2013 | Ranjan et al. |
| 8,413,229 B2 | 4/2013 | Mullick et al. |
| 8,429,409 B1 | 4/2013 | Wall et al. |
| 8,443,420 B2 | 5/2013 | Brown et al. |
| 8,447,983 B1 | 5/2013 | Beck et al. |
| 8,494,576 B1 | 7/2013 | Bye et al. |
| 8,504,097 B1 | 8/2013 | Cope et al. |
| 8,588,749 B1 | 11/2013 | Sadhvani et al. |
| 8,631,247 B2 | 1/2014 | O'Loughlin et al. |
| 8,632,000 B2 | 1/2014 | Laracey |
| 8,649,770 B1 | 2/2014 | Cope et al. |
| 8,667,607 B2 | 3/2014 | Paczkowski et al. |
| 8,707,056 B2 | 4/2014 | Felton |
| 8,712,407 B1 * | 4/2014 | Cope et al. ............. 455/426.1 |
| 8,718,554 B2 | 5/2014 | Abel |
| 8,719,586 B1 | 5/2014 | Paleja et al. |
| 8,726,343 B1 | 5/2014 | Borzycki et al. |
| 8,738,333 B1 | 5/2014 | Behera et al. |
| 8,750,839 B1 | 6/2014 | Paczkowski et al. |
| 8,752,140 B1 | 6/2014 | Paczkowski et al. |
| 8,762,298 B1 | 6/2014 | Ranjan et al. |
| 8,787,873 B1 | 7/2014 | Hitt et al. |
| 8,793,808 B2 | 7/2014 | Boccon-Gibod |
| 8,797,875 B2 * | 8/2014 | Garcia Martin et al. ...... 370/235 |
| 8,811,971 B2 | 8/2014 | Corda et al. |
| 8,831,998 B1 | 9/2014 | Cramer et al. |
| 8,839,460 B2 | 9/2014 | Shirlen et al. |
| 8,850,568 B2 | 9/2014 | Shirlen et al. |
| 8,856,600 B2 | 10/2014 | Zadigian et al. |
| 8,862,181 B1 | 10/2014 | Cope et al. |
| 8,863,252 B1 | 10/2014 | Katzer et al. |
| 8,881,977 B1 | 11/2014 | Paczkowski et al. |
| 8,886,925 B2 | 11/2014 | Qureshi et al. |
| 8,954,588 B1 | 2/2015 | Bertz et al. |
| 8,984,592 B1 | 3/2015 | Paczkowski et al. |
| 8,989,705 B1 | 3/2015 | Katzer et al. |
| 9,015,068 B1 * | 4/2015 | Bertz et al. ................ 705/26.8 |
| 9,021,585 B1 | 4/2015 | Paczkowski et al. |
| 9,027,102 B2 | 5/2015 | Katzer et al. |
| 9,049,013 B2 | 6/2015 | Paczkowski et al. |
| 9,049,186 B1 | 6/2015 | Paczkowski et al. |
| 9,066,230 B1 | 6/2015 | Paczkowski et al. |
| 9,069,952 B1 | 6/2015 | Paczkowski et al. |
| 9,104,840 B1 | 8/2015 | Paczkowski et al. |
| 9,118,655 B1 | 8/2015 | Paczkowski et al. |
| 2001/0041591 A1 | 11/2001 | Carroll |
| 2002/0035697 A1 | 3/2002 | McCurdy et al. |
| 2002/0091569 A1 | 7/2002 | Kitaura et al. |
| 2002/0095389 A1 | 7/2002 | Gaines |
| 2002/0156911 A1 | 10/2002 | Croman et al. |
| 2002/0166070 A1 | 11/2002 | Mualem et al. |
| 2002/0174344 A1 | 11/2002 | Ting |
| 2002/0181503 A1 | 12/2002 | Montgomery, Jr. |
| 2002/0184325 A1 | 12/2002 | Killcommons et al. |
| 2002/0194361 A1 | 12/2002 | Itoh et al. |
| 2002/0194496 A1 | 12/2002 | Griffin et al. |
| 2003/0045273 A1 | 3/2003 | Pyhalammi et al. |
| 2003/0093667 A1 | 5/2003 | Dutta et al. |
| 2003/0110046 A1 | 6/2003 | Cofta |
| 2003/0126225 A1 | 7/2003 | Camble et al. |
| 2003/0172163 A1 | 9/2003 | Fujita et al. |
| 2003/0216143 A1 | 11/2003 | Roese et al. |
| 2003/0229514 A2 | 12/2003 | Brown |
| 2003/0237002 A1 | 12/2003 | Oishi et al. |
| 2004/0158840 A1 | 8/2004 | Rothman et al. |
| 2004/0202328 A1 | 10/2004 | Hara |
| 2004/0233844 A1 | 11/2004 | Yu et al. |
| 2004/0234049 A1 | 11/2004 | Melideo |
| 2004/0243810 A1 | 12/2004 | Rindborg et al. |
| 2005/0015601 A1 | 1/2005 | Tabi |
| 2005/0045719 A1 | 3/2005 | Yang |
| 2005/0052994 A1 | 3/2005 | Lee |
| 2005/0091505 A1 | 4/2005 | Riley et al. |
| 2005/0123596 A1 | 6/2005 | Kohane et al. |
| 2005/0125396 A1 | 6/2005 | Liu |
| 2005/0138433 A1 | 6/2005 | Linetsky |
| 2005/0181796 A1 | 8/2005 | Kumar et al. |
| 2005/0228892 A1 | 10/2005 | Riley et al. |
| 2005/0235166 A1 | 10/2005 | England et al. |
| 2005/0239481 A1 | 10/2005 | Seligmann |
| 2005/0272445 A1 | 12/2005 | Zellner |
| 2005/0289355 A1 | 12/2005 | Kitariev et al. |
| 2006/0030291 A1 | 2/2006 | Dawson et al. |
| 2006/0036851 A1 | 2/2006 | DeTreville |
| 2006/0040641 A1 | 2/2006 | Dawson et al. |
| 2006/0129488 A1 | 6/2006 | Vincent |
| 2006/0156026 A1 | 7/2006 | Utin |
| 2006/0164978 A1 | 7/2006 | Werner et al. |
| 2006/0171537 A1 | 8/2006 | Enright |
| 2006/0190605 A1 | 8/2006 | Franz et al. |
| 2006/0212853 A1 | 9/2006 | Sutardja |
| 2006/0224901 A1 | 10/2006 | Lowe |
| 2006/0245438 A1 | 11/2006 | Sajassi et al. |
| 2006/0258289 A1 | 11/2006 | Dua |
| 2006/0259790 A1 | 11/2006 | Asokan et al. |
| 2006/0261949 A1 | 11/2006 | Kim et al. |
| 2006/0277307 A1 | 12/2006 | Bernardin et al. |
| 2006/0277433 A1 | 12/2006 | Largman et al. |
| 2007/0011061 A1 | 1/2007 | East |
| 2007/0038648 A1 | 2/2007 | Chetwood et al. |
| 2007/0061535 A1 | 3/2007 | Xu et al. |
| 2007/0078988 A1 | 4/2007 | Miloushev et al. |
| 2007/0079120 A1 | 4/2007 | Bade et al. |
| 2007/0094273 A1 | 4/2007 | Fritsch et al. |
| 2007/0094691 A1 | 4/2007 | Gazdzinski |
| 2007/0118880 A1 | 5/2007 | Mauro, II |
| 2007/0143210 A1 | 6/2007 | Yeung et al. |
| 2007/0162759 A1 | 7/2007 | Buskey et al. |
| 2007/0167167 A1 | 7/2007 | Jiang |
| 2007/0177771 A1 | 8/2007 | Tanaka et al. |
| 2007/0180120 A1 | 8/2007 | Bainbridge et al. |
| 2007/0186212 A1 | 8/2007 | Mazzaferri et al. |
| 2007/0197261 A1 | 8/2007 | Humbel |
| 2007/0214332 A1 | 9/2007 | Sonoda et al. |
| 2007/0276969 A1 | 11/2007 | Bressy et al. |
| 2007/0277223 A1 | 11/2007 | Datta et al. |
| 2008/0005794 A1 | 1/2008 | Inoue et al. |
| 2008/0014867 A1 | 1/2008 | Finn |
| 2008/0020745 A1 * | 1/2008 | Bae et al. ................ 455/422.1 |
| 2008/0022374 A1 | 1/2008 | Brown et al. |
| 2008/0051142 A1 | 2/2008 | Calvet et al. |
| 2008/0092213 A1 | 4/2008 | Wei et al. |
| 2008/0097793 A1 | 4/2008 | Dicks et al. |
| 2008/0108321 A1 | 5/2008 | Taaghol et al. |
| 2008/0109662 A1 | 5/2008 | Natarajan et al. |
| 2008/0121687 A1 | 5/2008 | Buhot |
| 2008/0146280 A1 | 6/2008 | Sasse et al. |
| 2008/0155271 A1 | 6/2008 | Barck et al. |
| 2008/0159129 A1 | 7/2008 | Songhurst et al. |
| 2008/0159131 A1 | 7/2008 | Hoeflin et al. |
| 2008/0162361 A1 | 7/2008 | Sklovsky |
| 2008/0176538 A1 | 7/2008 | Terrill et al. |

(56) References Cited

U.S. PATENT DOCUMENTS

| | | |
|---|---|---|
| 2008/0188178 A1 | 8/2008 | Maugars et al. |
| 2008/0201212 A1 | 8/2008 | Hammad et al. |
| 2008/0201578 A1 | 8/2008 | Drake |
| 2008/0208681 A1 | 8/2008 | Hammad et al. |
| 2008/0212503 A1 | 9/2008 | Lipford et al. |
| 2008/0232259 A1 | 9/2008 | Thomson |
| 2008/0244758 A1 | 10/2008 | Sahita et al. |
| 2009/0047923 A1 | 2/2009 | Jain et al. |
| 2009/0055278 A1 | 2/2009 | Nemani |
| 2009/0070272 A1 | 3/2009 | Jain |
| 2009/0075592 A1 | 3/2009 | Nystrom et al. |
| 2009/0089449 A1 | 4/2009 | Day |
| 2009/0113425 A1 | 4/2009 | Ports et al. |
| 2009/0118839 A1 | 5/2009 | Accapadi et al. |
| 2009/0144161 A1 | 6/2009 | Fisher |
| 2009/0147958 A1 | 6/2009 | Calcaterra et al. |
| 2009/0154348 A1 | 6/2009 | Newman |
| 2009/0164800 A1 | 6/2009 | Johansson et al. |
| 2009/0182605 A1 | 7/2009 | Lappas et al. |
| 2009/0182634 A1 | 7/2009 | Park et al. |
| 2009/0192915 A1 | 7/2009 | Fernandez |
| 2009/0193491 A1 | 7/2009 | Rao |
| 2009/0227290 A1 | 9/2009 | Chien |
| 2009/0248445 A1 | 10/2009 | Harnick |
| 2009/0271321 A1 | 10/2009 | Stafford |
| 2009/0281947 A1 | 11/2009 | Erel |
| 2009/0300599 A1 | 12/2009 | Piotrowski |
| 2009/0312011 A1 | 12/2009 | Huomo et al. |
| 2009/0320028 A1 | 12/2009 | Gellerich et al. |
| 2010/0031325 A1 | 2/2010 | Maigne et al. |
| 2010/0052844 A1 | 3/2010 | Wesby |
| 2010/0075669 A1 | 3/2010 | Sparks et al. |
| 2010/0077487 A1 | 3/2010 | Travis et al. |
| 2010/0082977 A1 | 4/2010 | Boyle et al. |
| 2010/0125904 A1 | 5/2010 | Nice et al. |
| 2010/0128598 A1 | 5/2010 | Gandhewar et al. |
| 2010/0130170 A1 | 5/2010 | Liu et al. |
| 2010/0142517 A1 | 6/2010 | Montemurro et al. |
| 2010/0146589 A1 | 6/2010 | Safa |
| 2010/0153721 A1 | 6/2010 | Mellqvist |
| 2010/0162028 A1 | 6/2010 | Frank et al. |
| 2010/0190469 A1 | 7/2010 | Vanderveen et al. |
| 2010/0198943 A1 | 8/2010 | Harrang et al. |
| 2010/0217709 A1 | 8/2010 | Aabye et al. |
| 2010/0223348 A1 | 9/2010 | Przybysz et al. |
| 2010/0228937 A1 | 9/2010 | Bae et al. |
| 2010/0241847 A1 | 9/2010 | van der Horst et al. |
| 2010/0246818 A1 | 9/2010 | Yao |
| 2010/0269156 A1 | 10/2010 | Hohlfeld et al. |
| 2010/0274726 A1 | 10/2010 | Florek et al. |
| 2010/0279653 A1 | 11/2010 | Poltorak |
| 2010/0281139 A1 | 11/2010 | Deprun |
| 2010/0291896 A1 | 11/2010 | Corda |
| 2010/0299313 A1 | 11/2010 | Orsini et al. |
| 2010/0306353 A1 | 12/2010 | Briscoe et al. |
| 2010/0318802 A1 | 12/2010 | Balakrishnan |
| 2010/0328064 A1 | 12/2010 | Rogel |
| 2011/0010720 A1 | 1/2011 | Smith et al. |
| 2011/0014948 A1 | 1/2011 | Yeh |
| 2011/0021175 A1 | 1/2011 | Florek et al. |
| 2011/0035604 A1 | 2/2011 | Habraken |
| 2011/0050713 A1 | 3/2011 | McCrary et al. |
| 2011/0055084 A1 | 3/2011 | Singh |
| 2011/0063093 A1 | 3/2011 | Fung et al. |
| 2011/0072492 A1 | 3/2011 | Mohler et al. |
| 2011/0078081 A1 | 3/2011 | Pirzadeh et al. |
| 2011/0082711 A1 | 4/2011 | Poeze et al. |
| 2011/0107426 A1 | 5/2011 | Yen et al. |
| 2011/0112968 A1 | 5/2011 | Florek et al. |
| 2011/0113479 A1 | 5/2011 | Ganem |
| 2011/0130635 A1 | 6/2011 | Ross |
| 2011/0138064 A1 | 6/2011 | Rieger et al. |
| 2011/0145926 A1 | 6/2011 | Dalcher et al. |
| 2011/0154032 A1 | 6/2011 | Mauro, II |
| 2011/0166883 A1 | 7/2011 | Palmer et al. |
| 2011/0173090 A1 | 7/2011 | Miller et al. |
| 2011/0202916 A1 | 8/2011 | VoBa et al. |
| 2011/0208797 A1 | 8/2011 | Kim |
| 2011/0212707 A1 | 9/2011 | Mahalal |
| 2011/0216701 A1 | 9/2011 | Patel et al. |
| 2011/0226853 A1 | 9/2011 | Soh et al. |
| 2011/0237190 A1 | 9/2011 | Jolivet |
| 2011/0238573 A1 | 9/2011 | Varadarajan |
| 2011/0238992 A1 | 9/2011 | Jancula et al. |
| 2011/0246609 A1 | 10/2011 | Kim |
| 2011/0251892 A1 | 10/2011 | Laracey |
| 2011/0254687 A1 | 10/2011 | Arponen et al. |
| 2011/0258462 A1 | 10/2011 | Robertson et al. |
| 2011/0276677 A1 | 11/2011 | Osuga et al. |
| 2011/0281558 A1 | 11/2011 | Winter |
| 2011/0294418 A1 | 12/2011 | Chen |
| 2012/0003983 A1 | 1/2012 | Sherlock et al. |
| 2012/0011572 A1 | 1/2012 | Chew et al. |
| 2012/0021683 A1 | 1/2012 | Ma et al. |
| 2012/0023583 A1 | 1/2012 | Sallam |
| 2012/0028575 A1 | 2/2012 | Chen et al. |
| 2012/0029997 A1 | 2/2012 | Khan et al. |
| 2012/0036347 A1 | 2/2012 | Swanson et al. |
| 2012/0040662 A1* | 2/2012 | Rahman et al. ............... 455/423 |
| 2012/0052801 A1 | 3/2012 | Kulkarni |
| 2012/0072481 A1 | 3/2012 | Nandlall et al. |
| 2012/0072979 A1 | 3/2012 | Cha et al. |
| 2012/0084211 A1 | 4/2012 | Petrov et al. |
| 2012/0084438 A1 | 4/2012 | Raleigh et al. |
| 2012/0084836 A1 | 4/2012 | Mahaffey et al. |
| 2012/0089700 A1 | 4/2012 | Safruti et al. |
| 2012/0102202 A1 | 4/2012 | Omar |
| 2012/0115433 A1 | 5/2012 | Young et al. |
| 2012/0123868 A1 | 5/2012 | Brudnicki et al. |
| 2012/0130839 A1 | 5/2012 | Koh et al. |
| 2012/0131178 A1 | 5/2012 | Zhu et al. |
| 2012/0137117 A1 | 5/2012 | Bosch et al. |
| 2012/0137119 A1 | 5/2012 | Doerr et al. |
| 2012/0143703 A1 | 6/2012 | Wall et al. |
| 2012/0147750 A1 | 6/2012 | Pelletier et al. |
| 2012/0149327 A1 | 6/2012 | Raboisson et al. |
| 2012/0149338 A1 | 6/2012 | Roundtree |
| 2012/0150601 A1 | 6/2012 | Fisher |
| 2012/0154413 A1 | 6/2012 | Kim et al. |
| 2012/0158467 A1 | 6/2012 | Hammad et al. |
| 2012/0159163 A1 | 6/2012 | von Behren et al. |
| 2012/0159612 A1 | 6/2012 | Reisgies |
| 2012/0163206 A1 | 6/2012 | Leung et al. |
| 2012/0168494 A1 | 7/2012 | Kim |
| 2012/0178365 A1 | 7/2012 | Katz et al. |
| 2012/0178366 A1 | 7/2012 | Levy et al. |
| 2012/0190332 A1 | 7/2012 | Charles |
| 2012/0191536 A1 | 7/2012 | Chen et al. |
| 2012/0196529 A1 | 8/2012 | Huomo et al. |
| 2012/0196586 A1 | 8/2012 | Grigg et al. |
| 2012/0198519 A1 | 8/2012 | Parla et al. |
| 2012/0202423 A1 | 8/2012 | Tiedemann et al. |
| 2012/0207165 A1 | 8/2012 | Davis |
| 2012/0226582 A1 | 9/2012 | Hammad |
| 2012/0226772 A1 | 9/2012 | Grube et al. |
| 2012/0238206 A1 | 9/2012 | Singh et al. |
| 2012/0252480 A1 | 10/2012 | Krutt et al. |
| 2012/0255016 A1 | 10/2012 | Sallam |
| 2012/0258690 A1 | 10/2012 | Chen et al. |
| 2012/0259722 A1 | 10/2012 | Mikurak |
| 2012/0266076 A1 | 10/2012 | Lockhart et al. |
| 2012/0266220 A1 | 10/2012 | Brudnicki et al. |
| 2012/0272306 A1 | 10/2012 | Benaloh et al. |
| 2012/0282924 A1 | 11/2012 | Tagg et al. |
| 2012/0284195 A1 | 11/2012 | McMillen et al. |
| 2012/0291095 A1 | 11/2012 | Narendra et al. |
| 2012/0295588 A1 | 11/2012 | Chen et al. |
| 2012/0297187 A1 | 11/2012 | Paya et al. |
| 2012/0303961 A1 | 11/2012 | Kean et al. |
| 2012/0304286 A1 | 11/2012 | Croll et al. |
| 2012/0309345 A1 | 12/2012 | Wake et al. |
| 2012/0324293 A1 | 12/2012 | Grube et al. |
| 2012/0329425 A1 | 12/2012 | Velusamy et al. |
| 2013/0014259 A1 | 1/2013 | Gribble et al. |

(56) References Cited

U.S. PATENT DOCUMENTS

| | | |
|---|---|---|
| 2013/0019323 A1 | 1/2013 | Arvidsson et al. |
| 2013/0031374 A1 | 1/2013 | Thom et al. |
| 2013/0034081 A1* | 2/2013 | Ban et al. ............... 370/331 |
| 2013/0035056 A1 | 2/2013 | Prasad et al. |
| 2013/0047197 A1 | 2/2013 | Saroiu et al. |
| 2013/0054474 A1 | 2/2013 | Yeager |
| 2013/0062417 A1 | 3/2013 | Lee et al. |
| 2013/0067552 A1 | 3/2013 | Hawkes et al. |
| 2013/0074067 A1 | 3/2013 | Chowdhry |
| 2013/0086385 A1 | 4/2013 | Poeluev |
| 2013/0086684 A1 | 4/2013 | Mohler |
| 2013/0097302 A9 | 4/2013 | Khedouri et al. |
| 2013/0097657 A1 | 4/2013 | Cardamore et al. |
| 2013/0105565 A1 | 5/2013 | Kamprath |
| 2013/0109307 A1 | 5/2013 | Reisgies et al. |
| 2013/0111095 A1 | 5/2013 | Mehrotra et al. |
| 2013/0117186 A1 | 5/2013 | Weinstein et al. |
| 2013/0124583 A1 | 5/2013 | Ferguson et al. |
| 2013/0125114 A1 | 5/2013 | Frascadore |
| 2013/0136126 A1 | 5/2013 | Wang et al. |
| 2013/0138521 A1 | 5/2013 | Want et al. |
| 2013/0138959 A1 | 5/2013 | Pelly et al. |
| 2013/0140360 A1 | 6/2013 | Graylin |
| 2013/0143489 A1 | 6/2013 | Morris et al. |
| 2013/0145429 A1 | 6/2013 | Mendel et al. |
| 2013/0159021 A1* | 6/2013 | Felsher ............... 705/3 |
| 2013/0159186 A1 | 6/2013 | Brudnicki et al. |
| 2013/0159710 A1 | 6/2013 | Khan |
| 2013/0160120 A1 | 6/2013 | Malaviya et al. |
| 2013/0174147 A1 | 7/2013 | Sahita et al. |
| 2013/0175984 A1 | 7/2013 | Yamazaki et al. |
| 2013/0191632 A1 | 7/2013 | Spector et al. |
| 2013/0212704 A1 | 8/2013 | Shablygin et al. |
| 2013/0262264 A1 | 10/2013 | Karstoft Jens |
| 2013/0263212 A1 | 10/2013 | Faltyn et al. |
| 2013/0290709 A1 | 10/2013 | Muppidi et al. |
| 2013/0305333 A1* | 11/2013 | Katzer et al. ............... 726/7 |
| 2013/0310003 A1 | 11/2013 | Sadhvani et al. |
| 2013/0332456 A1 | 12/2013 | Arkin |
| 2013/0343181 A1 | 12/2013 | Stroud et al. |
| 2013/0345530 A1 | 12/2013 | McRoberts et al. |
| 2013/0347064 A1 | 12/2013 | Aissi |
| 2013/0347103 A1 | 12/2013 | Veteikis et al. |
| 2014/0007182 A1 | 1/2014 | Qureshi et al. |
| 2014/0007222 A1 | 1/2014 | Qureshi et al. |
| 2014/0033316 A1* | 1/2014 | Paczkowski et al. ............ 726/26 |
| 2014/0047548 A1* | 2/2014 | Bye et al. ............... 726/26 |
| 2014/0059642 A1 | 2/2014 | Deasy et al. |
| 2014/0074508 A1 | 3/2014 | Ying et al. |
| 2014/0089243 A1* | 3/2014 | Oppenheimer ............... 706/46 |
| 2014/0089699 A1 | 3/2014 | O'Connor et al. |
| 2014/0104287 A1 | 4/2014 | Nalluri et al. |
| 2014/0106709 A1* | 4/2014 | Palamara et al. ............ 455/411 |
| 2014/0141718 A1 | 5/2014 | Stromberg et al. |
| 2014/0155025 A1 | 6/2014 | Parker et al. |
| 2014/0173747 A1 | 6/2014 | Govindaraju |
| 2014/0188738 A1 | 7/2014 | Huxham |
| 2014/0215196 A1 | 7/2014 | Berlin |
| 2014/0245444 A1 | 8/2014 | Lutas et al. |
| 2014/0254381 A1 | 9/2014 | Racz Sandor et al. |
| 2014/0267332 A1 | 9/2014 | Chhabra et al. |
| 2014/0279558 A1 | 9/2014 | Kadi et al. |
| 2014/0281544 A1 | 9/2014 | Paczkowski et al. |
| 2014/0298026 A1 | 10/2014 | Isozaki et al. |
| 2015/0106805 A1 | 4/2015 | Melander et al. |
| 2015/0169885 A1 | 6/2015 | Paczkowski et al. |
| 2015/0172928 A1 | 6/2015 | Katzer et al. |

FOREIGN PATENT DOCUMENTS

| | | | |
|---|---|---|---|
| WO | 2013170228 | A2 | 11/2013 |
| WO | 2014004590 | A2 | 1/2014 |
| WO | 2014018575 | A2 | 1/2014 |
| WO | 2014025687 | A2 | 2/2014 |
| WO | WO2014158431 | A1 | 10/2014 |

OTHER PUBLICATIONS

Office Action dated Dec. 19, 2013, U.S. Appl. No. 13/557,213 filed on Jul. 25, 2012 (IDF 8385 [4300-21100]).
FAIPP Pre-Interview Communication dated Nov. 27, 2013, U.S. Appl. No. 13/610,856 filed Sep. 11, 2012 (IDF 8420 [4300-22000]).
Notice of Allowance date Jan. 31, 2014, U.S. Appl. No. 13/610,856 filed Sep. 11, 2012 (IDF 8420 [4300-22000]).
Cope, Warren B., et al., "Extended Trusted Security Zone Radio Modem", filed Nov. 26, 2013, U.S. Appl. No. 14/090,667 (IDF 8312A [4300-19401]).
Paczkowski, Lyle W., et al., "Trusted Security Zone Containers for the Protection and Confidentiality of Trusted Service Manager Data", filed Feb. 16, 2014, PCT Application No. PCT/US14/16651 (IDF 9133W0 [4300-32601]).
Foreign Communication from a Related Counterpart—International Search Report and Written Opinion, dated Dec. 2, 2013, PCT/US13/40673, filed on May 10, 2013 (IDF 7911W0 [4300-13001]).
Giesecke & Devrient, "The OTA Platform in the World of LTE", Jan. 2011, http://www.gi-de.com/gd_media/media/en/documents/brochures/mobile_security_2/cste_1/OTA-and-LTE.pdf.
Pesonen, Lauri, "Development of Mobile Payment Ecosystem—NFC Based Payment Services", Aug. 27, 2008.
Foreign Communication from a Related Counterpart—International Search Report and Written Opinion, dated Feb. 4, 2014, PCT/US13/47729, filed on Jun. 25, 2013 (IDF 7968W0 [4300-14401]).
Foreign Communication from a Related Counterpart—International Search Report and Written Opinion, dated Feb. 4, 2014, PCT/US13/51750, filed on Jul. 24, 2013 (IDF 8422W0 [4300-22201]).
Notice of Allowance dated Dec. 22, 2014, U.S. Appl. No. 13/470,203, filed on May 11, 2012 [IDF 7911 (4300-13000)].
Notice of Allowance dated Feb. 5, 2015, U.S. Appl. No. 13/533,969, filed on Jun. 27, 2012 [IDF 8284 (4300-18400)].
Office Action dated Dec. 15, 2014, U.S. Appl. No. 13/571,348, filed on Aug. 10, 2012 [IDF 8283 (4300-18500)].
FAIPP Pre-Interview Communication dated Feb. 12, 2015, U.S. Appl. No. 14/066,661, filed on Oct. 29, 2013 [IDF 8745 (4300-27400)].
Notice of Allowance dated Dec. 3, 2014, U.S. Appl. No. 13/594,777 filed on Aug. 25, 2012 [IDF 8814 (4300-27800)].
First Action Interview Office Action dated Dec. 3, 2014, U.S. Appl. No. 13/594,779, filed on Aug. 25, 2012 [IDF 8816 (4300-28000)].
Notice of Allowance dated Feb. 26, 2015, U.S. Appl. No. 13/786,450, filed on Mar. 5, 2013 [IDF 8879 (4300-29300)].
FAIPP Pre-Interview Communication dated Dec. 16, 2014, U.S. Appl. No. 13/898,435, filed on May 20, 2013 [IDF 9039 (4300-31500)].
Notice of Allowance dated Feb. 20, 2015, U.S. Appl. No. 13/898,435, filed on May 20, 2013 [IDF 9039 (4300-31500)].
Notice of Allowance dated Dec. 19, 2014, U.S. Appl. No. 13/844,325, filed on Mar. 15, 2013 [IDF 9113 (4300-32100)].
Notice of Allowance dated Jan. 2, 2015, U.S. Appl. No. 13/831,463, filed on Mar. 14, 2013 [IDF 9133 (4300-32600)].
FAIPP Pre-Interview Communication dated Feb. 4, 2015, U.S. Appl. No. 14/075,663, filed on Nov. 8, 2013 [IDF 9406 (4300-37800)].
FAIPP Pre-Interview Communication dated Feb. 25, 2015, U.S. Appl. No. 14/163,047, filed on Jan. 24, 2014 [IDF 9757 (4300-44300)].
Restriction Requirement dated Jan. 5, 2015, U.S. Appl. No. 13/857,139 filed on Apr. 4, 2013 [IDF 9182 (4300-33000)].
Foreign Communication from a Related Counterpart—International Preliminary Report on Patentability, dated Jan. 8, 2015, PCT/US13/47729, filed on Jun. 25, 2013 [IDF 7968W0 (4300-14401)].
Foreign Communication from a Related Counterpart—International Preliminary Report on Patentability, dated Feb. 19, 2015, PCT/US13/53617, filed on Aug. 5, 2013 [IDF 8283W0 (4300-18501)].
Foreign Communication from a Related Counterpart—International Preliminary Report on Patentability, dated Feb. 5, 2015, PCT/US13/51750, filed on Jul. 24, 2013 [IDF 8422W0 (4300-22201)].

(56) References Cited

OTHER PUBLICATIONS

Katzer, Robin D., et al., "Web Server Bypass of Backend Process on Near Field Communications and Secure Elements Chips", filed Feb. 26, 2015, U.S. Appl. No. 14/632,850 [IDF 7911A (4300-13002)].
Neson, Tracy L., et al., "Mated Universal Serial Bus (USB) Wireless Dongles Configured with Destination Addresses", filed Jan. 26, 2015, U.S. Appl. No. 14/606,011 [IDF 10558 (4300-53400)].
Paczkowski, Lyle W., et al., "Trusted Code Generation and Verification to Prevent Fraud from Maleficent External Devices that Capture Data", filed Jan. 14, 2015, U.S. Appl. No. 14/592,218 [IDF 10559 (4300-53500)].
Notice of Allowance dated May 27, 2014, U.S. Appl. No. 13/482,731, filed on May 29, 2012 (IDF 7896 [4300-12900]).
Advisory Action dated May 29, 2014, U.S. Appl. No. 13/470,203, filed on May 11, 2012 (IDF 7911 [4300-13000]).
FAIPP Pre-Interview Communication dated May 12, U.S. Appl. No. 13/294,177, filed on Nov. 11, 2011 (IDF 7936 [4300-14000]).
Final Office Action dated Apr. 10, 2014, U.S. Appl. No. 13/571,348, filed on Aug. 10, 2012 (IDF 7911 [4300-18500]).
FAIPP Pre-Interview Communication dated Apr. 3, 2014, U.S. Appl. No. 13/802,383, filed on Mar. 13, 2013 (IDF 8722 [4300-27000]).
First Action Interview Office Action dated May 23, 2014, U.S. Appl. No. 13/802,383, filed on Mar. 13, 2013 (IDF 8722 [4300-27000]).
Foreign Communication from a Related Counterpart—International Search Report and Written Opinion, dated Apr. 22, 2014, PCT/US13/53617, filed on Aug. 5, 2013 (IDF 88283W0 [4300-18501]).
Final Office Action dated Sep. 9, 2013, U.S. Appl. No. 13/440,980, filed on Apr. 5, 2012 (IDF 7971 [4300-14600]).
Office Action dated Sep. 25, 2013, U.S. Appl. No. 13/571,348, filed on Aug. 10, 2012 (IDF 7911 [4300-18500]).
Notice of Allowance dated Aug. 30, 2013; U.S. Appl. No. 13/540,437, filed Jul. 2, 2012 (IDF 8312 [4300-19400]).
Restriction Requirement dated Nov. 1, 2013, U.S. Appl. No. 13/557,213 filed on Jul. 25, 2012 [IDF 8385 (4300-21100)].
Notice of Allowance dated Oct. 16, 2013, U.S. Appl. No. 13/556,200, filed on Jul. 24, 2012 (IDF 8422 [4300-22200]).
FAIPP Pre-Interview Communication dated Mar. 20, 2014, U.S. Appl. No. 13/482,731, filed on May 29, 2012 (IDF 7896 [4300-12900]).
Final Office Action dated Mar. 27, 2014, U.S. Appl. No. 13/470,203, filed on May 11, 2012 (IDF 7911 [4300-13000]).
Notice of Allowance dated Jan. 28, 2014, U.S. Appl. No. 12/486,873, filed on Jun. 18, 2009 [IDE 6000].
Paczkowski, Lyle W., et al., "Trusted Security Zone Access to Peripheral Devices", filed Jan. 6, 2014, U.S. Appl. No. 14/148,714 (IDF 8422A [4300-22202]).
Office Action dated Aug. 29, 2014, U.S. Appl. No. 13/470,203, filed on May 11, 2012 (IDF 7911 [4300-13000]).
Notice of Allowance dated Oct. 8, 2014, U.S. Appl. No. 13/294,177, filed on Nov. 11, 2011 (IDF 7936 [4300-14000]).
FAIPP Pre-Interview Communication dated Sep. 25, 2014, U.S. Appl. No. 13/533,969, filed on Jun. 27, 2012 (IDF 8284 [4300-18400]).
Notice of Allowance dated Oct. 6, 2014, U.S. Appl. No. 13/844,357, filed on Mar. 15, 2013 (IDF 8613 [4300-24700]).
FAIPP Pre-Interview Communication dated Nov. 12, 2014, U.S. Appl. No. 13/844,145, filed on Mar. 15, 2013 (IDF 8670 [4300-26100]).
Notice of Allowance dated Sep. 19, 2014, U.S. Appl. No. 13/594,778, filed on Aug. 25, 2012 (IDF 8815 [4300-27900]).
Final Office Action dated Nov. 7, 2014, U.S. Appl. No. 13/786,450, filed on Mar. 5, 2013 (IDF 8879 [4300-29300]).
Notice of Allowance dated Sep. 26, 2014, U.S. Appl. No. 13/831,486, filed on Mar. 14, 2013 (IDF 8926 [4300-29600]).
FAIPP Pre-Interview Communication dated Nov. 7, 2014, U.S. Appl. No. 13/802,404, filed on Mar. 13, 2013 (IDF 9037 [4300-31300]).
FAIPP Pre-Interview Communication dated Oct. 29, 2014, U.S. Appl. No. 13/844,282, filed on Mar. 15, 2013 (IDF 9054 [4300-31700]).
FAIPP Pre-Interview Communication dated Oct. 21, 2014, U.S. Appl. No. 13/844,325, filed on Mar. 15, 2013 (IDF 9113 [4300-32100]).
Foreign Communication from a Related Counterpart—International Preliminary Report on Patentability, dated Nov. 20, 2014, PCT/US13/40673, filed on May 10, 2013 (IDF 7911W0 [4300-13001]).
Perrig, Adrian, et al., "SPINS: Security Protocols for Sensor Networks," ACM, Sep. 2002, vol. 8, pp. 521-534.
Clark, CJ., et al. "Anti-tamper JTAG TAP design enables DRM to JTAG registers and P1687 on-chip instruments", 2010 IEEE, International Symposium on Hardware-Oriented Security and Trust (HOST). Pub. Date: 2010. Relevant pp. 19-24. http://ieeexplore.ieee.org/stamp/stamp.isp2tp=&arnumber=5513119.
Lee, Jeremy, et al., "A Low-Cost Solution for Protecting IPs Against Scan-Based Side Channel Attacks," 24th IEEE VLSI Test Symposium. Pub. Date: 2006. http//ieeexplore.ieee.org/stamp/stamp.jsp?tp=&arnumber= 1617569.
Advisory Action dated Jun. 23, 2014, U.S. Appl. No. 13/571,348, filed on Aug. 10, 2012 (IDF 7911 [4300-18500]).
Notice of Allowance dated Jun. 4, 2014, U.S. Appl. No. 13/557,213 filed on Jul. 25, 2012 (IDF 8385 [4300-21100]).
FAIPP Pre-Interview Communication dated Aug. 4, 2014, U.S. Appl. No. 13/844,357, filed on Mar. 15, 2013 (IDF 8613 [4300-24700]).
Notice of Allowance dated Jul. 8, 2014, U.S. Appl. No. 13/802,383, filed on Mar. 13, 2013 (IDF 8722 [4300-27000]).
Restriction Requirement dated Aug. 14, 2014, U.S. Appl. No. 13/594,777 filed on Aug. 25, 2012 (IDF 8814 [4300-27800]).
FAIPP Pre-Interview Communication dated Jul. 17, 2014, U.S. Appl. No. 13/594,778, filed on Aug. 25, 2012 (IDF 8815 [4300-27900]).
FAIPP Pre-Interview Communication dated Jul. 17, 2014, U.S. Appl. No. 13/594,779, filed on Aug. 25, 2012 (IDF 8816 [4300-28000]).
Office Action dated May 5, 2014, U.S. Appl. No. 13/786,450, filed on Mar. 5, 2013 (IDF 8879[4300-29300]).
FAIPP Pre-Interview Communication dated Aug. 6, 2014, U.S. Appl. No. 13/831,486, filed on Mar. 14, 2013 (IDF 8926 [4300-29600]).
Ahmed, Farid, et al., "Correlation-based Watermarking Method for Imagine Authentication Applications", Society of Photo-Optical Instrumentation Engineers, Feb. 17, 2004, pp. 1834-1838.
Foreign Communication from a Related Counterpart—International Search Report and Written Opinion, dated Jul. 11, 2014, PCT/US14/16651, filed on Feb. 16, 2014 (IDF 9133W0 [4300-32601]).
Kunkel, Philip M., et al., "Secure Peer-to-Peer Call Forking Facilitated by Trusted 3rd Party Voice Server Provisioning", filed Oct. 29, 2013, U.S. Appl. No. 14/066,661 (IDF 8745 [4300-27400]).
Bertz, Lyle T., et al., "Framework for Real-Time Brokering of Digital Content Delivery," filed Aug. 25, 2012, U.S. Appl. No. 13/594,777 (IDF 8814 [4300-27800]).
Bertz, Lyle T., et al.,"Reservations in Real-Time Brokering of Digital Content Delivery," filed Aug. 25, 2012, U.S. Appl. No. 13/594,778 (IDF 8815 [4300-27900]).
Bertz, Lyle T., et al., "File Retrieval in Real-Time Brokering of Digital Content Delivery," filed Aug. 25, 2012, U.S. Appl. No. 13/594,779 (IDF 8816 [4300-28000]).
Paczkowski, Lyle W., et al., "Trusted Security Zone Watermark", filed Mar. 5, 2013, U.S. Appl. No. 13/786,450 (IDF 8879 [4300-29300]).
Paczkowski, Lyle W., et al., "Trusted Processing Location Within a Graphics Processing Unit", filed Jul. 10, 2013, U.S. Appl. No. 13/939,175 (IDF 9040 [4300-31600]).
McCracken, Billy Gene, Jr., et al. "Mobile Communication Device Profound Identity Brokering Framework", filed Jun. 6, 2013, U.S. Appl. No. 13/912,190 (IDF 9263 [4300-33600]).
Urbanek, Robert E., Subscriber Identity Module Virtualization:, filed Nov. 20, 2013, U.S. Appl. No. 14/085,474 (IDF 9328 [4300-35700]).
Krieger, Michael D., et al., "Billing Varied Service Based on Tier", filed on Nov. 8, 2013, U.S. Appl. No. 14/075,663 (IDF 9406 [4300-37800]).
Paczkowski, Lyle W., et al., "Trusted Display and Transmission of Digital Ticket Documentation", filed Jan. 24, 2014, U.S. Appl. No. 14/163,047 (IDF 9757 [4300-44300]).
Loman, Clint H., et al., "Verification of Mobile Device Integrity During Activation", filed Mar. 28, 2014, U.S. Appl. No. 14/229,532 (IDF 9758 [4300-44400]).

(56) References Cited

OTHER PUBLICATIONS

Paczkowski, Lyle W., et al., "Network Based Temporary Trust Extension to a Remote or Mobile Device Enabled via Specialized Cloud Services", filed Jul. 29, 2014, U.S. Appl. No. 14/446,330 (IDF 10449 [4300-51700]).
Cordes, Kevin R., et al., "Digest of Biographical Information for an Electronic Device with Static and Dynamic Portions", filed on Apr. 4, 2013, U.S. Appl. No. 13/857,141 (IDF 8917 [4300-29500]).
Cordes, Kevin R., et al., "Radio Frequency Identity (RFID) Chip Electrically and Communicatively Coupled to Motherboard of Mobile Communication Device", filed on Apr. 4, 2013, U.S. Appl. No. 13/857,139 (IDF 9182 [4300-33000]).
Cordes, Kevin R., et al., "System for Managing a Digest of Biographical Information Stored in a Radio Frequency Identity Chip Coupled to a Mobile Communication Device", filed on Apr. 4, 2013, U.S. Appl. No. 13/857,138 (IDF 9209 [4300-33300]).
FAIPP Pre-Interview Communication dated Oct. 24, 2012, U.S. Appl. No. 13/463,797, filed on May 3, 2012 (IDF 7956 [4300-14200]).
Notice of Allowance dated Mar. 1, 2013, U.S. Appl. No. 13/463,797, filed on May 3, 2012 (IDF 7956 [4300-14200]).
FAIPP Pre-Interview Communication dated Jun. 12, 2013, U.S. Appl. No. 13/440,980, filed on Apr. 5, 2012 (IDF 7971 [4300-14600]).
FAIPP Pre-Interview Communication dated Oct. 24, 2012, U.S. Appl. No. 13/463,801, filed on May 3, 2012 (IDF 8095 [4300-15500]).
Notice of Allowance dated Mar. 14, 2013, U.S. Appl. No. 13/463,801, filed on May 3, 2012 (IDF 8095 [4300-15500]).
FAIPP Pre-Interview Communication dated Jul. 25, 2013, U.S. Appl. No. 13/470,203, filed on May 11, 2012 (IDF 7911 [4300-13000]).
FAIPP Pre-Interview Communication dated Jun. 6, 2013, U.S. Appl. No. 13/571,348, filed on Aug. 10, 2012 (IDF 7911 [4300-18500]).
FAIPP Pre-Interview Communication dated Jun. 5, 2013, U.S. Appl. No. 13/556,200, filed on Jul. 24, 2012 (IDF 8422 [4300-22200]).
First Action Interview Office Action dated Aug. 19, 2013, U.S. Appl. No. 13/556,200, filed on Jul. 24, 2012 (IDF 8422 [4300-22200]).
First Action Interview Pre-Interview Communication dated Dec. 27, 2011, U.S. Appl. No. 12/486,873, filed on Jun. 18, 2009 [IDF 6000].
First Action Interview Office Action dated Feb. 13, 2012, U.S. Appl. No. 12/486,873, filed on Jun. 18, 2009 [IDF 6000].
Office Action dated Jul. 5, 2012, U.S. Appl. No. 12/486,873, filed on Jun. 18, 2009 [IDF 6000].
Final Office Action dated Feb. 1, 2013, U.S. Appl. No. 12/486,873, filed on Jun. 18, 2009 [IDF 6000].
Cope, Warren B., et al., "Electronic Purchase Transaction Trust Infrastructure", filed May 29, 2012, U.S. Appl. No. 13/482,731 (IDF 7896 [4300-12900]).
Cope, Warren B., et al., "Alternative hardware and Software Configuration for Near Field Communication", filed May 4, 2012, U.S. Appl. No. 13/463,797 (IDF 7956 [4300-14200]).
Cope, Warren B., et al., "Multiple Secure Elements in Mobile Electronic Device with Near Field Communication Capability", filed Apr. 5, 2012, U.S. Appl. No. 13/440,980 (IDF 7971 [4300-14600]).
Bye, Stephen James, et al., "Near Field Communication Authentication and Validation to Access Corporate Data", filed May 3, 2012, U.S. Appl. No. 13/463,801 (IDF 8095 [4300-15500]).
Katzer, Robin D., et al., "Web Server Bypass of Backend Process on Near Field Communications and Secure Elements Chips", filed May 11, 2012, U.S. Appl. No. 13/470,203 (IDF 7911 [4300-13000]).
Katzer, Robin D., et al., "Web Server Bypass of Backend Process on Near Field Communications and Secure Elements Chips", filed May 10, 2013, PCT Application No. PCT/US13/40673 (IDF 7911A [4300-13001]).
Katzer, Robin D., et al., "Secure Placement of Centralized Media Controller Application in Mobile Access Terminal ", filed Nov. 11, 2011, U.S. Appl. No. 13/294,177 (IDF 7936 [4300-14000]).
McRoberts, Leo Michael, et al., "End-to-End Trusted Communications Infrastructure", filed Jun. 25, 2012, U.S. Appl. No. 13/532,588 (IDF 7968 [4300-14400]).

McRoberts, Leo Michael, et al., "End-to-End Trusted Communications Infrastructure", filed on Jun. 25, 2013, PCT U.S. Appl. No. PCT/US13/47729 (IDF 7968A [4300-14401]).
Paczkowski, Lyle W., et al., "Trusted Policy and Charging Enforcement Function", filed Jun. 27, 2012, U.S. Appl. No. 13/533,969 (IDF 8284 [4300-18400]).
Bye, Stephen James, et al., "Systems and Methods for Provisioning and Using Multiple Trusted Security Zones on an Electronic Device", filed Aug. 10, 2012, U.S. Appl. No. 13/571,348 (IDF 8095 [4300-18500]).
Bye, Stephen James, et al., "Systems and Methods for Provisioning and Using Multiple Trusted Security Zones on an Electronic Device", filed on Aug. 5, 2013, PCT Serial No. PCT/US13/53617 (IDF 8283W0 [4300-18501]).
Cope, Warren B., et al., "Extended Trusted Security Zone Radio Modem", filed Jul. 2, 2012, U.S. Appl. No. 13/540,437 (IDE 8312 [4300-19400]).
Katzer, Robin D., et al., "Trusted Access to Third Party Applications Systems and Methods", filed Jul. 25, 2012, U.S. Appl. No. 13/557,213 (IDF 8385 [4300-21100]).
Paczkowski, Lyle W., et al., "System and Methods for Trusted Internet Domain Networking", filed Sep. 11, 2012, U.S. Appl. No. 13/610,856 (IDF 8420 [4300-22000]).
Paczkowski, Lyle W., et al., "Trusted Security Zone Access to Peripheral Devices", filed Jul. 24, 2012, U.S. Appl. No. 13/556,200 (IDF 8422 [4300-22200]).
Paczkowski, Lyle W., et al., "Trusted Security Zone Access to Peripheral Devices", filed Jul. 24, 2013, PCT Application No. PCT/US13/51750 (IDF 8422W0 [4300-22201]).
Paczkowski, Lyle W., et al., Enablement of a Trusted Security Zone Authentication for Remote Mobile Device Management Systems and Methods, filed Mar. 15, 2013, U.S. Appl. No. 13/844,357 (IDF 8613 [4300-24700]).
Paczkowski, Lyle W., et al., "Trusted Security Zone Communication Addressing on an Electronic Device", filed Mar. 15, 2013, U.S. Appl. No. 13/844,145 (IDF 8670 [4300-26100]).
Bye, Stephen James, et al., "Protection for Multimedia Files Pre-Downloaded to a Mobile Device", filed Apr. 15, 2013, U.S. Appl. No. 13/863,376 (IDF 8680 [4300-26500]).
Paczkowski, Lyle W., et al., "Point-of-Sale and Automated Teller Machine Transactions Using Trusted Mobile Access Device", filed Mar. 13, 2013, U.S. Appl. No. 13/802,383 (IDF 8722 [4300-27000]).
Paczkowski, Lyle W., et al., "Trusted Security Zone Re-Provisioning and Re-Use Capability for Refurbished Mobile Devices", filed Mar. 14, 2013, U.S. Appl. No. 13/831,486 (IDF 8926 [4300-29600]).
Paczkowski, Lyle W., et al., "Trusted Security Zone Enhanced with Trusted Hardware Drivers", filed Mar. 13, 2013, U.S. Appl. No. 13/802,404 (IDF 9037 [4300-31300]).
Paczkowski, Lyle W., et al., "Restricting Access of a Portable Communication Device to Confidential Data or Applications via a Remote Network Based on Event Triggers Generated by the Portable Communication Device", filed Mar. 15, 2013, U.S. Appl. No. 13/844,282 (IDF 9054 [4300-31700]).
Paczkowski, Lyle W., et al., "JTAG Fuse Vulnerability Determination and Protection Using a Trusted Execution Environment", filed Mar. 15, 2013, U.S. Appl. No. 13/844,325 (IDF 9133 [4300-32100]).
Paczkowski, Lyle W., et al., "Trusted Security Zone Containers for the Protection and Confidentiality of Trusted Service Manager Data", filed Mar. 14, 2013, U.S. Appl. No. 13/831,463 (IDF 9113 [4300-32600]).
Bye, Stephen James, et al., "Delivering Digital Content to a Mobile Device via a Digital Rights Clearing House", filed Apr. 10, 2013, U.S. Appl. No. 13/860,338 (IDF 9198 [4300-33200]).
Paczkowski, Lyle W., et al., "Method for Enabling Hardware Assisted Operating System Region for Safe Execution of Untrusted Code Using Trusted Transitional Memory", filed May 20, 2013, U.S. Appl. No. 13/898,435 (IDF 9039 [4300-31500]).
Paczkowski, Lyle W., et al., "Verifying Applications Using a Trusted Security Zone", filed Aug. 12, 2013, U.S. Appl. No. 13/964,112 (IDF 9175 [4300-32900]).
Paczkowski, Lyle W., et al., "Mobile Access Terminal with Local Call Session Control Function", filed Jun. 18, 2009, U.S. Appl. No. 12/486,873 (IDF 6000).

(56) References Cited

OTHER PUBLICATIONS

Zimmerman, Ann, "Check Out the Future of Shopping", The Wall Street Journal, Business, May 18, 2011, http://online.wsj.com/article/SB10001424052748703421204576329253050634700.html.

Garry, Michael, Kroger Test Prepares for Mobile Future:, SN, Supermarket News, Jun. 13, 2011, http://supermarketnews.com/technology/kroger-test-prepares-mobile-future.

Jones, Sally, "Industry Trends in POS Hardware for Mobile Devices", Aug. 31, 2011, http://pointofsale.com/20110831734/Mobile-POS-News/industry-trends-in-pos-hardware-for-mobile-devices.html.

FAIPP Pre-Interview Communication dated Mar. 25, 2015, U.S. Appl. No. 13/532,588, filed on Jun. 25, 2012 [IDF 7968 (4300-14400)].

FAIPP Pre-Interview Communication dated May 21, 2015, U.S. Appl. No. 14/090,667, filed Nov. 26, 2013 [IDF 8312A (4300-19401)].

Final Office Action dated Apr. 7, 2015, U.S. Appl. No. 13/844,145, filed on Mar. 15, 2013 [IDF 8670 (4300-26100)].

First Action Interview Office Action dated Apr. 7, 2015, U.S. Appl. No. 13/802,404, filed on Mar. 13, 2013 [IDF 9037 (4300-31300)].

FAIPP Pre-Interview Communication dated Mar. 26, 2015, U.S. Appl. No. 13/939,175, filed Jul. 10, 2013 [IDF 9040 (4300-31600)].

Final Office Action dated Mar. 24, 2015, U.S. Appl. No. 13/844,282, filed on Mar. 15, 2013 [IDF 9054 (4300-31700)].

FAIPP Pre-Interview Communication dated Mar. 24, 2015, U.S. Appl. No. 13/964,112, filed Aug. 12, 2013 [IDF 9175 (4300-32900)].

FAIPP Pre-Interview Communication dated Apr. 15, 2015, U.S. Appl. No. 14/085,474, filed on Nov. 20, 2013 [IDF 9328 (4300-35700)].

First Action Interview Office Action dated Apr. 10, 2015, U.S. Appl. No. 14/075,663, filed on Nov. 8, 2013 [IDF 9406 (4300-37800)].

Notice of Allowance dated Apr. 9, 2015, U.S. Appl. No. 14/163,047, filed on Jan. 24, 2014 [IDF 9757 (4300-44300)].

FAIPP Pre-Interview Communication dated Mar. 2, 2015, U.S. Appl. No. 13/857,138, filed on Apr. 4, 2013 [IDF 9209 (4300-33300)].

First Action Interview Office Action dated Apr. 20, 2015, U.S. Appl. No. 13/857,138, filed on Apr. 4, 2013 [IDF 9209 (4300-33300)].

Notice of Allowance dated May 29, 2015, U.S. Appl. No. 14/085,474, filed on Nov. 20, 2013 [IDF 9328 (4300-35700)].

FAIPP Pre-Interview Communication dated Jul. 2, 2015, U.S. Appl. No. 14/632,850, filed Feb. 26, 2015.

Notice of Allowance dated Jun. 17, 2015, U.S. Appl. No. 13/571,348, filed Aug. 10, 2012.

Notice of Allowance dated Aug. 4, 2015, U.S. Appl. No. 14/090,667, filed Nov. 26, 2013.

Notice of Allowance dated Jul. 6, 2015, U.S. Appl. No. 13/844,145, filed Mar. 15, 2013.

Notice of Allowance dated Jul. 6, 2015, U.S. Appl. No. 14/066,661, filed Oct. 29, 2013.

Notice of Allowance dated Aug. 14, 2015, U.S. Appl. No. 13/594,779, filed Aug. 25, 2012.

Final Office Action dated Aug. 27, 2015, U.S. Appl. No. 13/802,404, filed Mar. 13, 2013.

Notice of Allowance dated Jul. 7, 2015, U.S. Appl. No. 13/939,175, filed Jul. 10, 2013.

Advisory Action dated Jun. 10, 2015, U.S. Appl. No. 13/844,282, filed Mar. 15, 2013.

Office Action dated Aug. 24, 2015, U.S. Appl. No. 13/844,282, filed Mar. 15, 2013.

Notice of Allowance dated Aug. 3, 2015, U.S. Appl. No. 13/964,112, filed Aug. 12, 2013.

Notice of Allowance dated Jul. 1, 2015, U.S. Appl. No. 14/075,663, filed Nov. 8, 2013.

Notice of Allowance dated Jul. 22, 2015, U.S. Appl. No. 14/229,532, filed Mar. 28, 2014.

Notice of Allowance dated Aug. 28, 2015, U.S. Appl. No. 14/446,330, filed Jul. 29, 2014.

FAIPP Pre-Interview Communication dated Aug. 5, 2015, U.S. Appl. No. 13/857,141, filed Apr. 4, 2013.

FAIPP Pre-Interview Communication dated Jun. 2, 2015, U.S. Appl. No. 13/857,139, filed Apr. 4, 2013.

Notice of Allowance dated Jun. 11, 2015, U.S. Appl. No. 13/857,138, filed Apr. 4, 2013.

Henderson, Tristan, et al., "On the Wire, Congestion Pricing: Paying Your Way in Communications Networks," University College London, Sep./Oct. 2001, retrieved from: http://tristan.host.cs.st-andrews.ac.uk!research/pubs/ieeeic01.pdf.

* cited by examiner

TRUSTED SIGNALING IN LONG TERM EVOLUTION (LTE) 4G WIRELESS COMMUNICATION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Electronic communications may carry a wide variety of content, for example electronic mail, medical records, financial transactions, and other confidential information. The electronic communications may travel for some of the communication end-to-end path over unsecured communication links where the content may be subject to tampering or intrusion. A variety of security measures have been applied to provide increased security and to raise the level of difficulty for nefarious actors attempting to access the confidential information.

SUMMARY

In an embodiment, a method of wireless communication enabled by hardware assisted trust is disclosed. The method comprises receiving a trust zone request by an enhanced node B from an electronic device attached to a long term evolution (LTE) wireless network and forwarding the trust zone request from the enhanced node B to a home subscription server (HSS), wherein the enhanced node B forwards the trust zone request while executing in a trust zone of the enhanced node B, wherein the trust zone provides hardware assisted trust. The method further comprises receiving a trust zone request acknowledgement by the enhanced node B from the home subscription server while executing in the trust zone of the enhanced node B, forwarding the trust zone request acknowledgement by the enhanced node B to the electronic device, wherein the enhanced node B forwards the trust zone acknowledgement while executing in the trust zone of the enhanced node B, and receiving a trusted service request by the enhanced node B from the electronic device. The method further comprises forwarding the trusted service request by the enhanced node B to a policy control rules function (PCRF) server, wherein the enhanced node B forwards the trusted service request while executing in the trust zone of the enhanced node B, receiving a trusted service request acknowledgement by the enhanced node B from the policy control rules function server while executing in the trust zone of the enhanced node B, and forwarding the trusted service request acknowledgement to the electronic device, whereby the electronic device is provided a trusted bearer communication link.

In another embodiment, a method of wireless communication enabled by hardware assisted trust is disclosed. The method comprises attaching a mobile communication device by an enhanced node B to a long term evolution (LTE) wireless network, performing signaling on behalf of the mobile communication device to establish a trusted bearer communication link between the mobile communication device and the long term evolution wireless network, and receiving a trusted service termination request by the enhanced node B from the mobile communication device while executing in a trust zone of the enhanced node B. The method further comprises forwarding the trusted service termination request by the enhanced node B while executing in the trust zone of the enhanced node B to at least one of a mobility management entity (MME), a home subscriber server (HSS), a packet gateway (P-GW), and a policy charging rules function (PCRF) server, receiving a trusted service termination acknowledgment by the enhanced node B while executing in the trust zone of the enhanced node B, and forwarding the trusted service termination acknowledgment by the enhanced node B while executing in the trust zone of the enhanced node B, whereby the trusted bearer communication link from the mobile communication device and the long term evolution wireless network is taken down.

In another embodiment, a method of wireless communication enabled by hardware assisted trust is disclosed. The method comprises attaching a mobile communication device by a first enhanced node B to a first long term evolution (LTE) wireless network, performing signaling on behalf of the mobile communication device to establish a trusted bearer communication link between the mobile communication device and the first long term evolution wireless network, and transmitting a redirect request by the first enhanced node B to a mobility management entity (MME). The method further comprises analyzing by the mobility management entity a signaling trust continuum in a second long term evolution wireless network, and performing signaling on behalf of the mobile communication device to establish a trusted bearer communication link between the mobile communication device and the second long term evolution wireless network.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
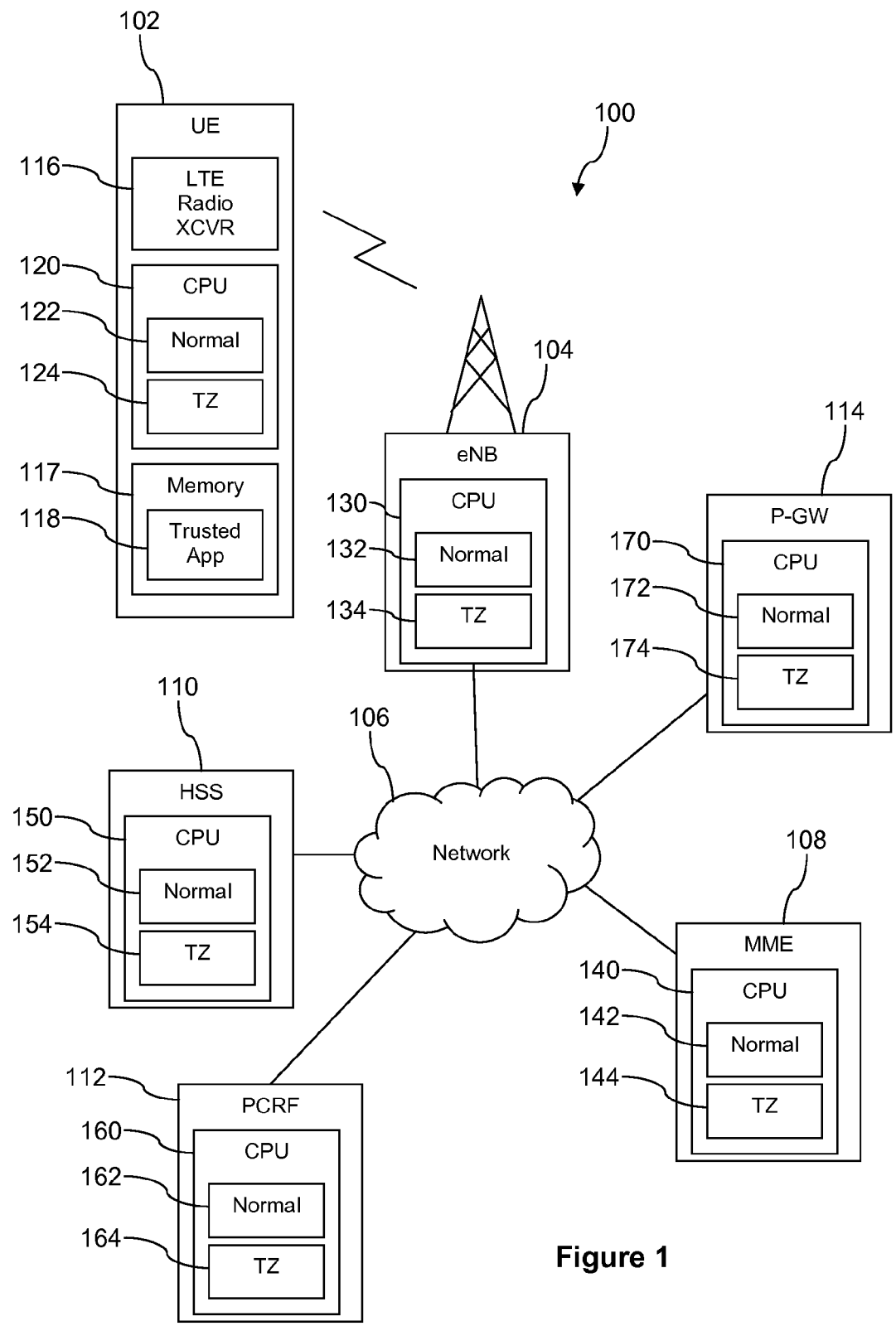
FIG. 1 is an illustration of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

In an embodiment, a system for trusted signaling in a long term evolution (LTE) wireless communication network is taught. Signaling among network nodes may be performed to establish a bearer channel between a wireless communication device, herein after referred to as a user equipment (UE), and other communication devices such as another user equipment or an application server. When a user equipment desires to execute a trusted network application over the communication network or to conduct other trusted communications over the communication network, a trusted bearer path may desirably be created to promote a continuity of trust between the user equipment and a communication end point, for example a trusted application server. As described in more detail below, trusted computation and/or trusted communication is based on hardware assisted security that reduces the ability of nefarious software or corrupt devices to write, read, or otherwise access trusted processing or trusted messages. For further details about creating a trusted bearer path, see U.S. patent application Ser. No. 13/532,588, filed Jun. 25, 2012, entitled "End-to-end Trusted Communications Infrastructure," by Leo Michael McRoberts, et al., which is hereby incorporated by reference in its entirety.

To provide trusted communications, however, the signaling that sets up the trusted bearer communication path may likewise desirably be conducted using a trusted signaling communication path. In an embodiment, a user equipment that is attached to the LTE network may execute a trusted application that executes some instructions in a trust security zone of the processor of the user equipment. In some contexts herein a trusted security zone may be referred to as a trust zone and/or as a trusted zone. While executing in the trust zone, the trusted application may send a trust zone request to a home subscriber server (HSS) to receive a trust acknowledgement and one or more user parameters associated with the subject trusted application. The trust zone request may be received by an enhanced node B (eNB) or cell tower. The enhanced node B may handle the trust zone request by executing in a trust zone of the enhanced node B processor to send the trust zone request on to a mobility management entity (MME) or other signaling node in the LTE network. The mobility management entity may handle the trust zone request by executing in a trust zone of the mobility management entity processor to send the trust zone request on to the home subscriber server. The home subscriber server may handle the trust zone request by executing in a trust zone of the home subscriber server and sending a trust zone acknowledgment and optional use parameters back to the user equipment.

In an embodiment, the home subscriber server confirms that the user equipment has rights to execute a trusted service request before generating and sending the trust zone acknowledgment. For example, the home subscriber server may determine if the user equipment is subscribed to at least one trusted network application. For example, the home subscriber server may determine if the subscriber associated with the user equipment is deemed a trust worthy subscriber, for example whether the subscriber has a pending unresolved security or trust violation event history.

The user parameters may be parameters related to the trusted network application or other trusted communication that the user equipment is requesting. The user parameters may be credentials or tokens used to invoke methods or functions of an application programming interface (API) provided by a trusted network application server. The user parameters may identify data that the user equipment should provide to receive access to the requested trusted service or trusted communication. The user parameters may define a level of access to one or more trusted network applications to which the user equipment is allowed. The user parameters may define a biometric signature, a format of a biometric signature, and/or an encoding method of a biometric signature.

After trust zone processing is established in the signaling path to which it is attached, the user equipment may send a trusted service request from its trust zone to a policy and charging rules function (PCRF) node. It is understood that the trusted service request may be transported by a plurality of nodes in the long term evolution network, each handling the trusted service request in a trust zone of their processor, for example the enhanced node B, the mobility management entity, the home subscriber service, and possibly other nodes. The policy and charging rules function node determines if the trusted service request meets the standards of a trusted communication and if the user equipment has rights to execute the requested trusted service. If the trusted service request is authorized, the policy and charging rules function node sends a trusted service acknowledge and optional use parameters over the signaling path to the user equipment. Said in other words, the policy and charging rules function confirms that a policy allows the user equipment to invoke the requested trusted service request before generating and sending the trusted service acknowledgment. Again, the trusted service acknowledgement and optional use parameters are transported by nodes executing in a trust zone of their processors. In an embodiment, the trusted service acknowledgement comprises trusted bearer communication link path information to support establishing and/or setting up the trusted bearer path. The trusted bearer path or trusted bearer channel is then activated, and the user equipment accesses the subject trusted services via the trusted bearer path.

When it has completed its access to the trusted service, the user equipment may send a trust termination request to the policy and charging rules function node, and the policy and charging rules function node may send a trust termination acknowledge back to the user equipment. The user equipment may then send an exit trust zone command to the enhanced node B while executing in the trust zone of the user equipment processor. After having sent the exit trust zone command, the user equipment may exit trusted zone processing. The enhanced node B may then forward the exit trust zone command to the mobility management entity while executing in the trust zone of the enhanced node B processor. After having forwarded the exit trust zone command, the enhanced node B may exit trust zone processing. The mobility management entity may then forward the exit trust zone command to the home subscriber service while executing in the trust zone of the mobility management entity processor. After having forwarded the exit trust zone command, the mobility management entity may exit trust zone processing. The home subscriber service may then forward the exit trust zone command to the policy and charging rules function node while executing in the trust zone of the home subscriber service processor. After having forwarded the exit trust zone command, the home subscriber service may exit trust zone processing. The policy and charging rules function node may forward the exit trust zone command to a packet gateway while executing in the trust zone of the policy and charging rules function node. After having forwarded the exit trust zone command, the policy and charging rules function node may exit trust zone processing.

When it receives the exit trust zone command, the packet gateway may first mediate the tearing down of the trusted bearer path and then exit trust zone processing. Alternatively, other nodes in the trusted signaling path may control or mediate the tearing down of the trusted bearer path, for example before they exit processing in their trust zone. At this point in time, the trusted bearer path has been taken down. After the trusted bearer path has been taken down and after signaling returns to normal signaling, a normal bearer channel may be activated or brought up.

In an embodiment, the user equipment may have a need during a trusted communication session using a trusted bearer path to enter or obtain communication services from a foreign network (here the term "foreign network" is used to indicate a wireless communication network other than the primary network to which the user equipment has subscribed service). The user equipment may send a redirect request from its trust zone to the mobility management entity. The mobility management entity may probe the signaling endpoint in the foreign network to determine if the foreign network can support a trusted signaling path and a trusted bearer path to provide the requested end-to-end trusted communication bearer path. If the foreign network can support these trust needs, the trusted bearer channel is bridged into the foreign network where an end-to-end trusted bearer path is likewise provided to the user equipment.

A trusted security zone provides chipsets with a hardware root of trust, a secure execution environment for applications, and secure access to peripherals. A hardware root of trust means the chipset should only execute programs intended by the device manufacturer or vendor and resists software and physical attacks, and therefore remains trusted to provide the intended level of security. The chipset architecture is designed to promote a programmable environment that allows the confidentiality and integrity of assets to be protected from specific attacks. Trusted security zone capabilities are becoming features in both wireless and fixed hardware architecture designs. Providing the trusted security zone in the main mobile device chipset and protecting the hardware root of trust removes the need for separate secure hardware to authenticate the device or user. To ensure the integrity of the applications requiring trusted data, such as a mobile financial services application, the trusted security zone also provides the secure execution environment where only trusted applications can operate, safe from attacks. Security is further promoted by restricting access of non-trusted applications to peripherals, such as data inputs and data outputs, while a trusted application is running in the secure execution environment. In an embodiment, the trusted security zone may be conceptualized as hardware assisted security.

A complete trusted execution environment (TEE) may be implemented through the use of the trusted security zone hardware and software architecture. The trusted execution environment is an execution environment that is parallel to the execution environment of the main mobile device operating system. The trusted execution environment and/or the trusted security zone may provide a base layer of functionality and/or utilities for use of applications that may execute in the trusted security zone. For example, in an embodiment, trust records, trust tokens, and/or trust symbols may be generated by the base layer of functionality and/or utilities of the trusted execution environment and/or trusted security zone for use in trusted end-to-end communication links to document a continuity of trust of the communications. Through standardization of application programming interfaces (APIs), the trusted execution environment becomes a place to which scalable deployment of secure services can be targeted. A device which has a chipset that has a trusted execution environment on it may exist in a trusted services environment, where devices in the trusted services environment are trusted and protected against attacks. The trusted execution environment can be implemented on mobile phones and tablets as well as extending to other trusted devices such as personal computers, servers, sensors, medical devices, point-of-sale terminals, industrial automation, handheld terminals, automotive, etc.

The trusted security zone is implemented by partitioning all of the hardware and software resources of the mobile device into two partitions: a secure partition and a normal partition. The secure partition may be implemented by a first physical processor, and the normal partition may be implemented by a second physical processor. Alternatively, the secure partition may be implemented by a first virtual processor, and the normal partition may be implemented by a second virtual processor. Placing sensitive resources in the secure partition can protect against possible attacks on those resources. For example, resources such as trusted software applications may run in the secure partition and have access to hardware peripherals such as a touchscreen or a secure location in memory. Less secure peripherals such as wireless radios may be disabled completely while the secure partition is being accessed, while other peripherals may only be accessed from the secure partition. While the secure partition is being accessed through the trusted execution environment, the main mobile operating system in the normal partition is suspended, and applications in the normal partition are prevented from accessing the secure peripherals and data. This prevents corrupted applications or malware applications from breaking the trust of the device.

The trusted security zone is implemented by partitioning the hardware and software resources to exist in a secure subsystem which is not accessible to components outside the secure subsystem. The trusted security zone is built into the processor architecture at the time of manufacture through hardware logic present in the trusted security zone which enables a perimeter boundary between the secure partition and the normal partition. The trusted security zone may only be manipulated by those with the proper credential and, in an embodiment, may not be added to the chip after it is manufactured. Software architecture to support the secure partition may be provided through a dedicated secure kernel running trusted applications. Trusted applications are independent secure applications which can be accessed by normal applications through an application programming interface in the trusted execution environment on a chipset that utilizes the trusted security zone.

In an embodiment, the normal partition applications run on a first virtual processor, and the secure partition applications run on a second virtual processor. Both virtual processors may run on a single physical processor, executing in a time-sliced fashion, removing the need for a dedicated physical security processor. Time-sliced execution comprises switching contexts between the two virtual processors to share processor resources based on tightly controlled mechanisms such as secure software instructions or hardware exceptions. The context of the currently running virtual processor is saved, the context of the virtual processor being switched to is restored, and processing is restarted in the restored virtual processor. Time-sliced execution protects the trusted security zone by stopping the execution of the normal partition while the secure partition is executing.

The two virtual processors context switch via a processor mode called monitor mode when changing the currently running virtual processor. The mechanisms by which the processor can enter monitor mode from the normal partition are tightly controlled. The entry to monitor mode can be triggered by software executing a dedicated instruction, the Secure Monitor Call (SMC) instruction, or by a subset of the hardware exception mechanisms such as hardware interrupts, which can be configured to cause the processor to switch into monitor mode. The software that executes within monitor mode then saves the context of the running virtual processor and switches to the secure virtual processor.

The trusted security zone runs a separate operating system that is not accessible to the device users. For security purposes, the trusted security zone is not open to users for installing applications, which means users do not have access to install applications in the trusted security zone. This prevents corrupted applications or malware applications from executing powerful instructions reserved to the trusted security zone and thus preserves the trust of the device. The security of the system is achieved at least in part by partitioning the hardware and software resources of the mobile phone so they exist in one of two partitions, the secure partition for the security subsystem and the normal partition for everything else. Placing the trusted security zone in the secure partition and restricting access from the normal partition protects against software and basic hardware attacks. Hardware logic ensures that no secure partition resources can be accessed by the normal partition components or applications. A dedicated secure partition operating system runs in a virtual processor separate from the normal partition operating system that likewise executes in its own virtual processor. Users may install applications on the mobile device which may execute in the normal partition operating system described above. The trusted security zone runs a separate operating system for the secure partition that is installed by the mobile device manufacturer or vendor, and users are not able to install new applications in or alter the contents of the trusted security zone.

Turning now to FIG. 1, a wireless communication system 100 is described. In an embodiment, the system 100 comprises a user equipment (UE) 102, an enhanced node B (eNB) 104, a network 106, a mobility management entity (MME) 108, a home subscriber service (HSS) 110, a policy and charging rules function (PCRF) 112, and a packet gateway (P-GW) 114. In an embodiment, the system 100 may further comprise other signaling nodes, for example a signaling gateway (S-GW). In an embodiment, these devices may form a portion of a long term evolution (LTE) wireless network. In some contexts, the long term evolution wireless network may be referred to as a fourth generation or a 4G wireless network. It is understood that the system 100 may comprise any number of the devices 102, 104, 108, 110, 112, and 114. The network 106 comprises one or more public communication networks, one or more private communication networks, or a combination thereof.

While the mobility management entity 108, the home subscriber service 110, the policy and charging rules function 112, and the packet gateway 114 may normally be considered to form a part of the network 106, they are shown outside of the "cloud" representing the network 106 to promote ease of description of the teachings of the present disclosure. The enhanced node B 104, the mobility management entity 108, the home subscriber service 110, the policy and charging rules function 112, and the packet gateway 114 may be implemented on computers. Computers are described in more detail hereinafter. While shown as separate entities, two or more of the mobility management entity 108, the home subscriber service 110, the policy and charging rules function 112, and the packet gateway 114 may be combined on one computer or one computer system.

The UE 102 may be a mobile phone, a personal digital assistant (PDA), a media player, or a wireless communication enabled computer, for example a long term evolution wireless communication enabled computer. The UE 102 may comprise a long term evolution radio transceiver 116, a memory 117, a trusted application 118, and a processor 120. The trusted application 118 may be stored in the memory 117 and executed by the processor 120. The processor 120 comprises a normal portion 122 and a trust zone portion 124. When the trusted application 118 is executed by the processor 120, at least some of the instructions of the trusted application 118 are executed in the trust zone 124 of the processor 120. Trusted zones and trusted execution environments are discussed in more detail above. The trust zone 124 provides hardware assisted security for processing that is deemed sensitive, for example processing that involves confidential personal and/or financial information.

The enhanced node B 104 comprises a processor 130 that comprises a normal portion 132 and a trust zone portion 134. The mobility management entity 108 comprises a processor 140 that comprises a normal portion 142 and a trust zone portion 144. The home subscriber service 110 comprises a processor 150 that comprises a normal portion 152 and a trust zone portion 154. The policy and charging rules function 112 comprises a processor 160 that comprises a normal portion 162 and a trust zone portion 164. The packet gateway 114 comprises a processor 170 that comprises a normal portion 172 and a trust zone portion 174. A variety of different trusted signaling scenarios may be executed in the process of setting-up and tearing down the trusted bearer path. Some of these trusted signaling scenarios are discussed in detail below with reference to message sequence diagrams depicted in FIG. 3, FIG. 4, FIG. 5, and FIG. 6.

Figure 2:
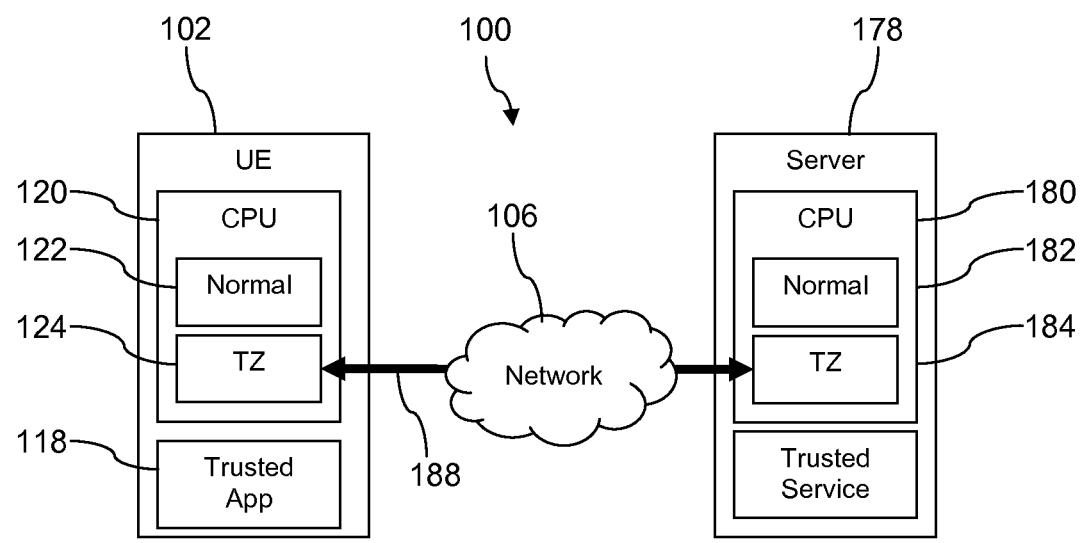
FIG. 2 is a further illustration of another aspect of the communication according to an embodiment of the disclosure.

Turning now to FIG. 2, a further portion of the wireless communication system 100 is illustrated. The UE 102 is illustrated as communicating with a server computer 178 via a trusted bearer 188. The server 178 comprises a processor 180 that comprises a normal portion 182 and a trust zone portion 184. Under this circumstance, the trust zone 124 of the UE 102 is communicating with the trust zone 184 of the server 178 via the network 106 via the bearer path 188 having continuity of trust.

The trusted communication may involve transport over the trusted bearer 188 of sensitive confidential or financial information. For example, the UE 102 may be sending and/or receiving sensitive health records, medical reports, or biometric data over the trusted bearer 188 to the server 178. In an embodiment, the server may be executing a trusted medical records application that stores the transmitted information in a data store and/or retrieves medical records information from a data store. The UE 102 may be embedded in a home medical apparatus such as a blood sugar level testing device used in a home by a diabetic patient under remote medical supervision. The UE 102 may transmit current blood sugar level readings linked to an identity of the diabetic patient over the trusted bearer 188 to the server 178. In an embodiment, the home medical apparatus may prompt the user to provide a biometric signature that will be coupled to the sensor information to confirm the linkage of the sensed information with the user, for example to prevent fraud or to provide identification assurance. The biometric signature may be an encoded finger print provided by a fingerprint scanner coupled to the home medical apparatus. The biometric signature may be an encoded retina scan provided by a retina scanner coupled to the home medical apparatus. The biometric signature may be related to some other biological parameter or profile of the subject user. It is contemplated that the system 100 may be used to perform signaling to establish a trusted bearer path suitable for transporting or otherwise communicating a wide variety of sensitive information.

The UE 102 conducts some communications using a trusted communication bearer, for example a bearer path provided over a trusted end-to-end communication infrastructure. For more details on a trusted end-to-end communication infrastructure, see U.S. patent application Ser. No. 13/532,588, filed Jun. 25, 2012, entitled "End-to-end Trusted Communications Infrastructure," by Leo Michael McRoberts, et al., which was incorporated by reference above. As taught herein, trusted signaling may be employed to set-up or to initiate the trusted bearer path. The trusted signaling may involve the UE 102, the enhanced node B 104, the mobility management entity 108, the home subscriber service 110, the policy and charging rules function 112, and/or the packet gateway 114 executing at least some instructions for signaling in their trust zones 124, 134, 144, 154, 164, and/or 174.

Figure 3:
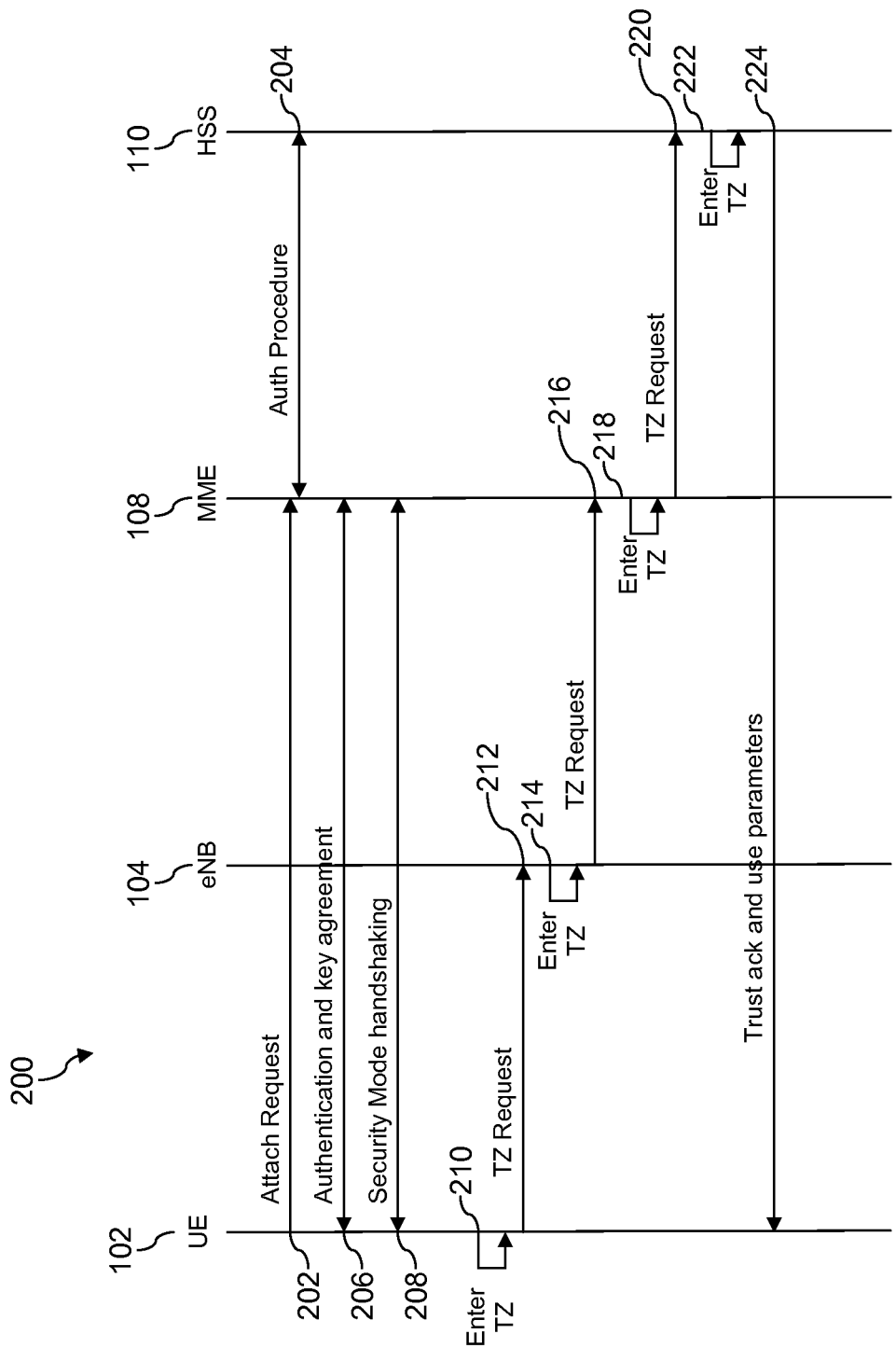
FIG. 3 is a message sequence diagram according to an embodiment of the disclosure.

Turning now to FIG. 3, a message sequence 200 is described. In an embodiment, the message sequence 200 may be performed when the UE 102 initially attaches to a long term evolution network, such as the network 106 illustrated in and described with reference to FIG. 1. The UE 102 sends an attach request 202 to the mobility management entity 108 via the enhanced node B 104. In response to receiving the attach request 202, the mobility management entity 108 conducts an authentication procedure 204 with the home subscriber service 110. It is understood that the authentication procedure 204 may entail one or more messages sent both to and from each of the mobility management entity 108 and the home subscriber service 110. On completion of the authentication procedure 204, the mobility management entity 108 conducts an authentication and key agreement procedure with the UE 102 via the enhanced node B 104. It is understood that the authentication and key agreement procedure 206 may entail one or more messages sent both to and from each of the mobility management entity 108 and the UE 102. At some later time, the UE 102 and the mobility management entity 108 may conduct security mode handshaking 208 that is not directly related to trusted signaling and may be pursuant to long term evolution wireless attachment procedures.

At some time, the UE 102 may wish to establish its potential for conducting trusted signaling and/or trusted bearer communications. Said in another way, at some indeterminate time but before initiating trusted signaling and/or trusted bearer communications, the UE 102 may wish to register with one or more nodes in the long term evolution wireless network as a UE capable of engaging in trusted communications. The UE 102 begins processing in its trust zone 124 at label 210. The trust zone 124 of the UE 102 sends a trust zone request 212 to the enhanced node B 104. The enhanced node B 104, in response to receiving the trust zone request 212, first begins processing in its trust zone 134 at label 214, and then the trust zone 134 of the enhanced node B 104 sends a trust zone request 216 to the mobility management entity 108. The mobility management entity 108, in response to receiving the trust zone request 216, first begins processing in its trust zone 144 at label 218, and then the trust zone 144 of the mobility management entity 108 sends a trust zone request 220 to the home subscriber service 110. The home subscriber service 110, in response to receiving the trust zone request 220, begins processing in its trust zone 154 at label 222. The home subscriber service 110 optionally determines use parameters and then sends a trust acknowledge message 224 optionally containing the use parameters back to the trust zone 124 of the UE 102 via the trust zone 144 of the mobility management entity 108 and the trust zone 134 of the enhanced node B 104.

Figure 4:
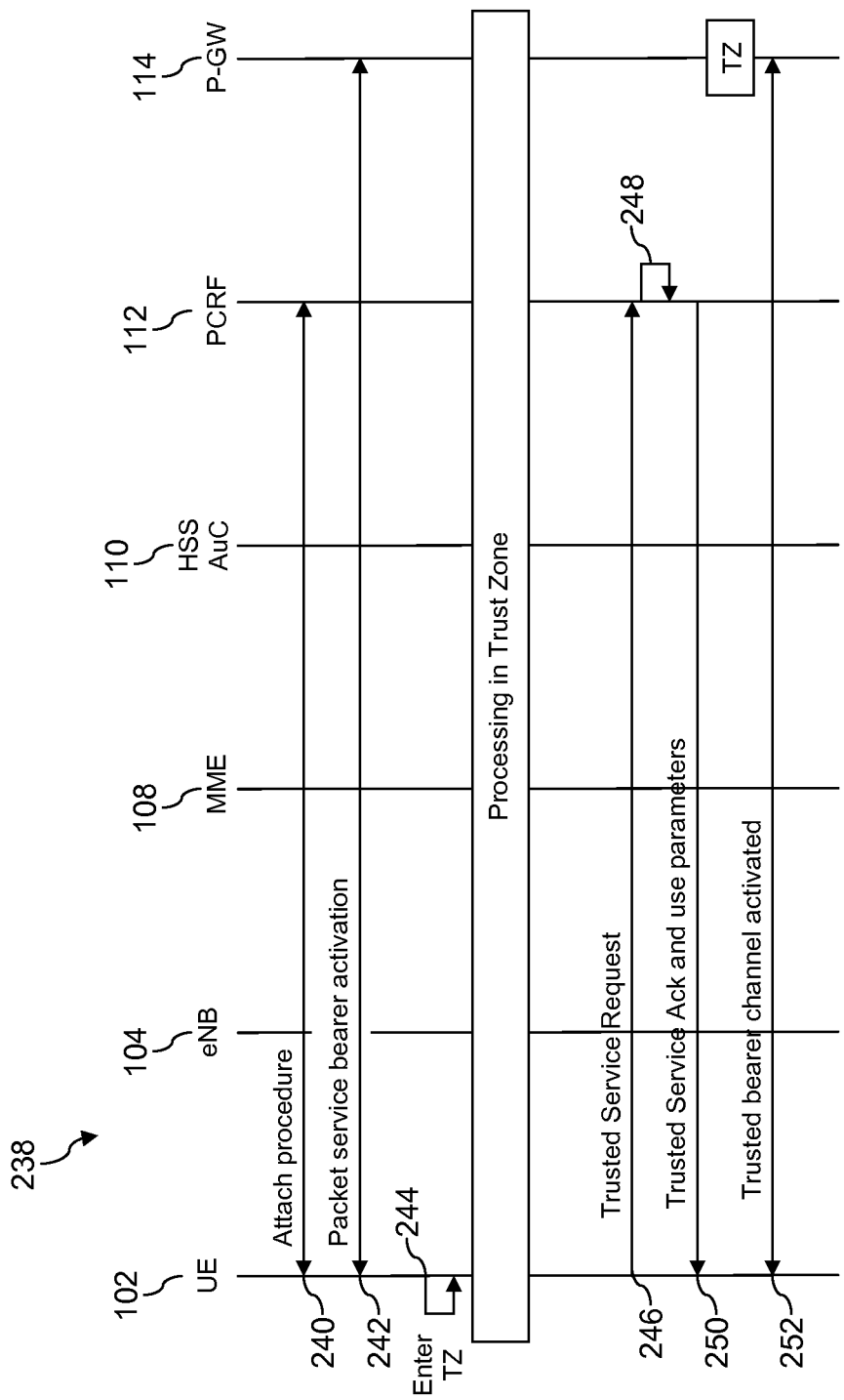
FIG. 4 is another message sequence diagram according to an embodiment of the disclosure.

Turning now to FIG. 4, a message sequence 238 is described. In an embodiment, the message sequence 238 may be performed when the UE 102 desires to engage in trusted communication over a trusted bearer path. The message sequence 238 represents exemplary signaling that the UE 102 may engage in to request the long term evolution wireless network to provide a trusted bearer path. At label 240, the UE 102 attaches to the long term evolution wireless network by messaging with the policy and charging rules function 112 via the enhanced node B 104, the mobility management entity 108, and the home subscriber service 110 (AuC function). At label 242 the UE 102 completes a packet service bearer activation procedure by messaging with the packet gateway 114 via the enhanced node B 104, the mobility management entity 108, the home subscriber service 110 (AuC function), and the policy and charging rules function 112. The processing associated with labels 240 and 242 may be conventional and promote conventional untrusted bearer communication via the long term evolution wireless network on the part of the UE 102.

At some time, the UE 102 may wish to communicate using a trusted bearer path. For example, the UE 102 may be embedded in a home medical apparatus and may desire to invoke a trusted network application executing on the server 178 to transmit and/or store medical sensor information in a data store coupled to the server 178. At label 244, the UE 102 begins processing in its trust zone 124 at label 244. In a message sequence similar to that described above with respect to FIG. 3, the UE 102 requests the enhanced node B 104 to execute in its trust zone 134, the mobility management entity 108 to execute in its trust zone 144, the home subscriber service 110 to execute in its trust zone 154, the policy and charging rules function 112 to execute in its trust zone 164, and the packet gateway 114 to execute in its trust zone 174. The condition where these several nodes are executing in their trust zones is indicated by the box containing the text "processing in trust zone." It is understood that the messages and/or procedures illustrated below this box containing the text "processing in trust zone" are conducted in the several trust zones of the subject network nodes and the UE 102. The UE 102 sends a trusted service request 246 to the policy and charging rules function 112 via the enhanced node B 104, the mobility management entity 108, and the home subscriber service 110. The policy and charging rules function 112 processes the trusted service request 246 at label 248, optionally determining use parameters. The policy and charging rules function 112 then sends a trusted service acknowledgement message 250 that optionally contains use parameters back to the UE 102 via the home subscriber service 110, the mobility management entity 108, and the enhanced node B 104.

At label 252, a trusted bearer channel is activated between the UE 102 and the packet gateway 114. It is understood that the radio link between the UE 102 and the enhanced node B 104 may be the first segment of the trusted bearer path. The packet gateway 114 may execute in its trust zone 174 to connect the UE 102 to a trusted end-to-end communication infrastructure. Said in another way, the packet gateway 114 may execute in its trust zone 174 to connect the UE 102 to a trusted bearer path and/or to provide a bearer path providing a continuity of trust, for example to connect the UE 102 to the server 178 via the trusted bearer path 188.

Figure 5:
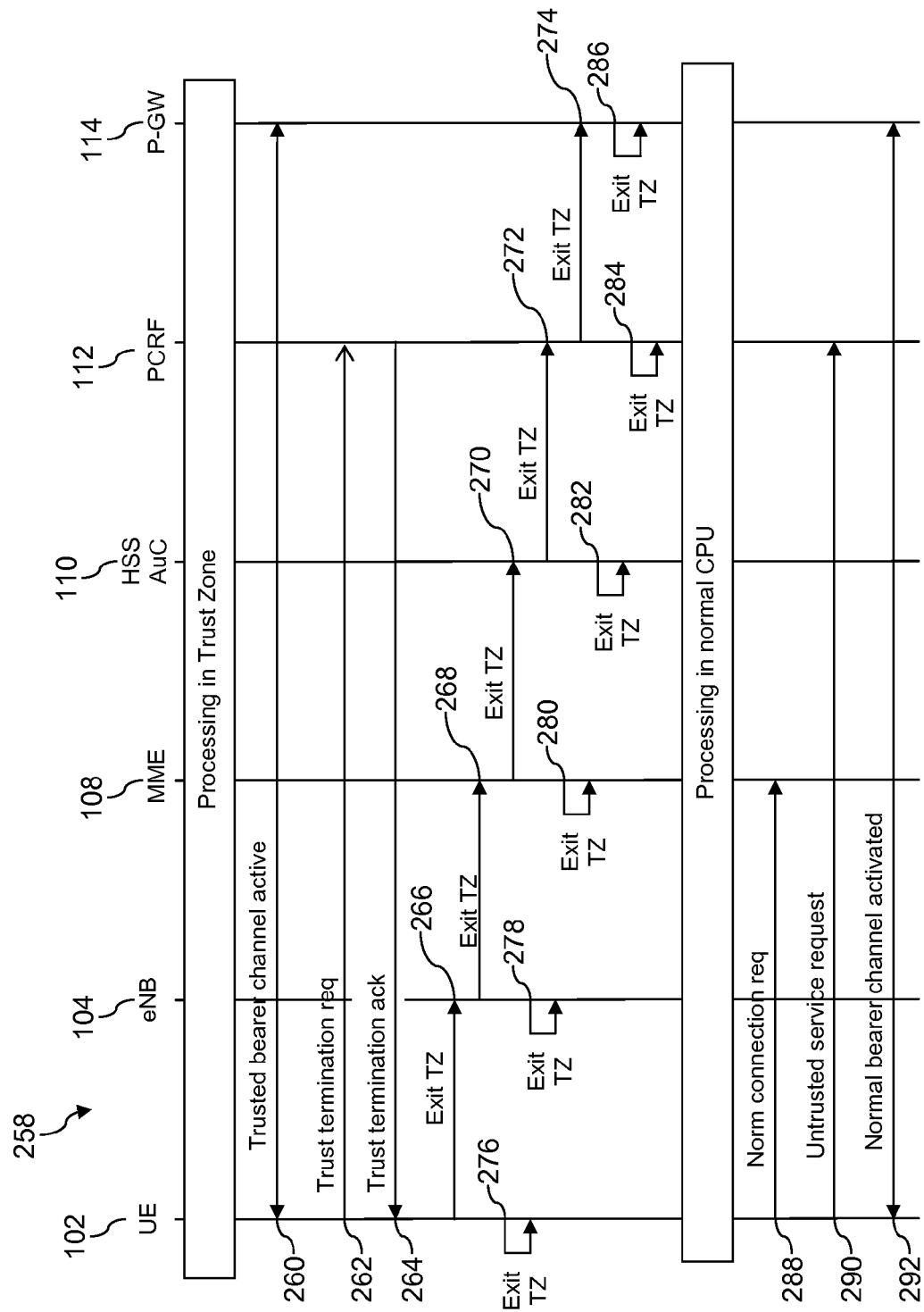
FIG. 5 is another message sequence diagram according to an embodiment of the disclosure.

Turning now to FIG. 5, a message sequence 258 is described. In an embodiment, the message sequence 258 may be performed when the UE 102 desires to discontinue trusted communication over the trusted bearer path and resume communication over a normal bearer path or over an untrusted bearer path. The UE 102 may prefer to conduct normal communications over a normal bearer path or over an untrusted bearer path because the normal bearer path may provide higher throughput rates or because communicating over the normal bearer path may be associated with a more economical rating and/or billing schedule.

The label 260 represents a trusted bearer channel and/or trusted bearer path is provided to the UE 102. The UE 102 sends a trust termination request 262 to the policy and charging rules function 112 via the enhanced node B 104, the mobility management entity 108, and the home subscriber service 110. The policy and charging rules function 112 sends a trust termination acknowledgement 264 to the UE 102 via the home subscriber service 110, the mobility management entity 108, and the enhanced node B 104.

In response to receiving the trust termination acknowledgement 264, the UE 102 first sends an exit trust zone request 266 to the enhanced node B 104 and then at label 276 exits processing in its trust zone 124 and begins processing in its normal portion 122. In response to receiving the exit trust zone request 266, the enhanced node B 104 first sends an exit trust zone request 268 to the mobility management entity 108 and then at label 278 exits processing in its trust zone 134 and begins processing in its normal portion 134. In response to receiving the exit trust zone request 268, the mobility management entity 108 first sends an exit trust zone request 270 to the home subscriber service 110 and then at label 280 exits processing in its trust zone 144 and begins processing in its normal portion 142. In response to receiving the exit trust zone request 270, the home subscriber service 110 first sends an exit trust zone request 272 to the policy and charging rules function 112 and then at label 282 exits processing in its trust zone 154 and begins processing in its normal portion 152. In response to receiving the exit trust zone request 272, the policy and charging rules function 112 first sends an exit trust zone request 274 to the packet gateway 114 and then at label 284 exits processing in its trust zone 164 and begins processing in its normal portion 162. In response to receiving the exit trust zone request 274, the packet gateway 114 first mediates tearing down the trusted bearer path and then at label 286 exits processing in its trust zone 174 and begins processing in its normal portion 172. Alternatively, other nodes in the trusted signaling path may mediate and/or control the tearing down of the trusted bearer path. The box containing the text "processing in normal CPU" represents all of the nodes and the UE 102 processing in their normal portions.

At label 288, the UE 102 may send a normal connection request to the mobility management entity 108 via the enhanced node B 104. At label 290, the UE 102 may send an untrusted service request to the policy and charging rules function 112 via the enhanced node B 104, the mobility management entity 108, and the home subscriber service 110. At label 292, the UE 102 may communicate via a normal bearer channel via the enhanced node B 104 and the packet gateway 114.

Figure 6:
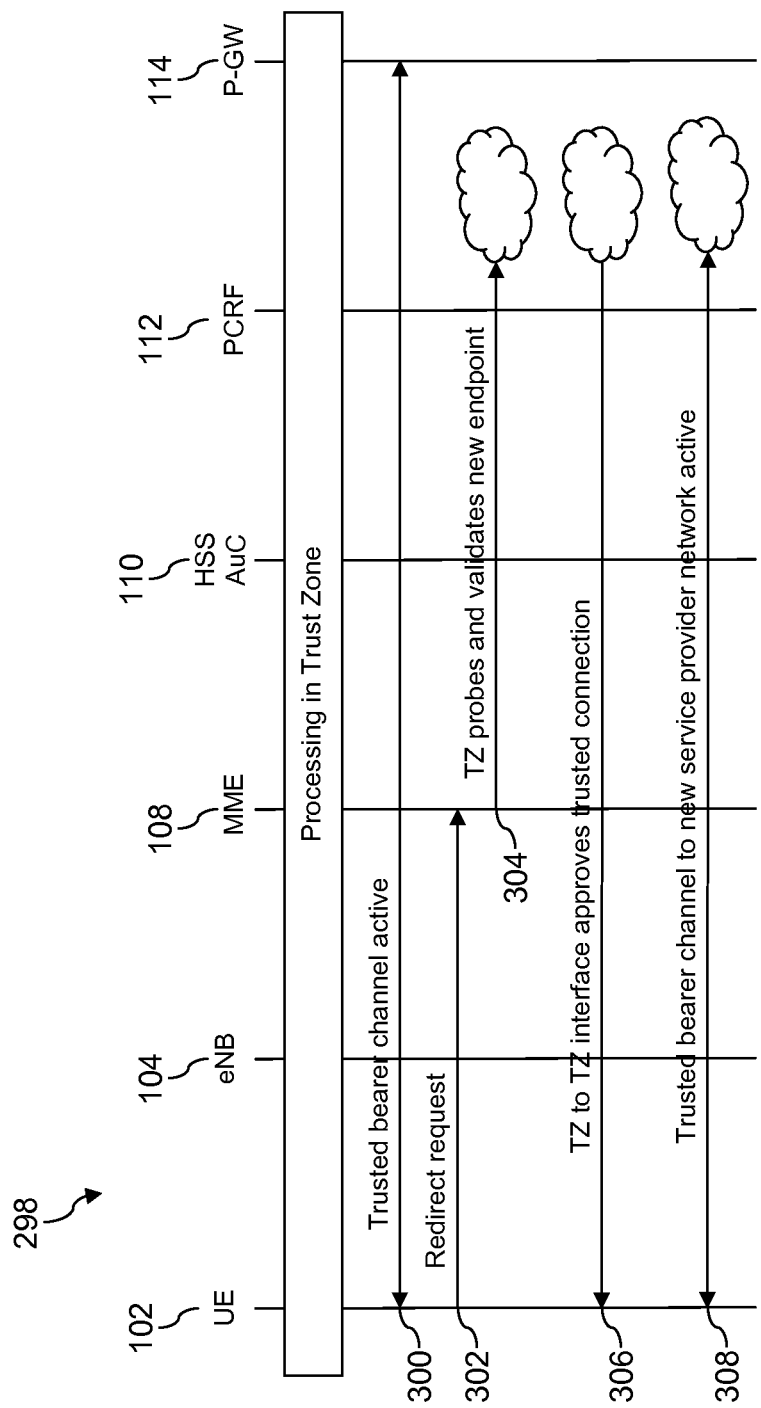
FIG. 6 is another message sequence diagram according to an embodiment of the disclosure.

Turning now to FIG. 6, a message sequence 298 is described. In an embodiment, the message sequence 298 may be performed when the UE 102 roams from a first service provider network into a second service provider network while the UE 102 is engaged in trusted communication using a trusted bearer path provided by the first service provider network. The box containing the text "processing in trust zone" represents that the several nodes and the UE 102 are processing in their respective trust zones. The label 300 shows the UE 102 engaged in communication over a trusted bearer channel via the enhanced node B 102 and the packet gateway 114. At label 302, in response to determining that the UE 102 is to roam into a second service provider network, either the UE 102 or the enhanced node B 104 sends a redirect request 302 to the mobility management entity 108. The mobility management entity 108 performs a probe or investigation of the trust zone processing capability of the second service provider network. The second service provider network sends a trust zone to trust zone interface trusted connection approval 306 to the UE 102 via the mobility management entity 108 and the enhanced node B 104. At label 308, the UE 102 is illustrated communicating via a trusted bearer channel provided by the second service provider network.

While not illustrated in FIG. 6, when the UE 102 is communicating via a trusted bearer channel provided by the second service provider network, the UE 102 may be provided a radio communication link by an enhanced node B operated by the second service provider network that is different from the enhanced node B 104 of the first service provider network. Likewise, the UE 102 may be coupled to the trusted bearer channel by a packet gateway operated by the second service provider network that is different from the packet gateway 114 of the first service provider network. In some cases, the packet gateway 114 of the first service provider network may continue to be a part of the trusted bearer channel or trusted bearer path, for example to connect to the server 178 which may continue to connected to the trusted bearer path even while the UE 102 has roamed into a foreign network or into the second service provider network.

It will be appreciated by one skilled in the art that the present disclosure contemplates a variety of alternative message sequences and flows based on the specific message sequences described above with reference to FIG. 3, FIG. 4, FIG. 5, and FIG. 6. For example, the flow of some messages may bypass some of the nodes described in the flow path from the UE 102 to other signaling nodes. Additionally, in some cases, the time sequence of some messages may be different. For example, in an embodiment, a node may exit its trust zone first and then send an exit trust zone request to another node. One skilled in the art will also appreciate that while the descriptions above are directed to the context of trusted communications in a long term evolution wireless network, that the descriptions may equally apply to other wireless communication networks. It is sometimes the case that new paradigms of communication that are first developed or invented for use in one communication system, for example the trusted signaling in a long term evolution wireless network described herein, may over time become a paradigm that is expropriated and used in later generation technologies.

Figure 7:
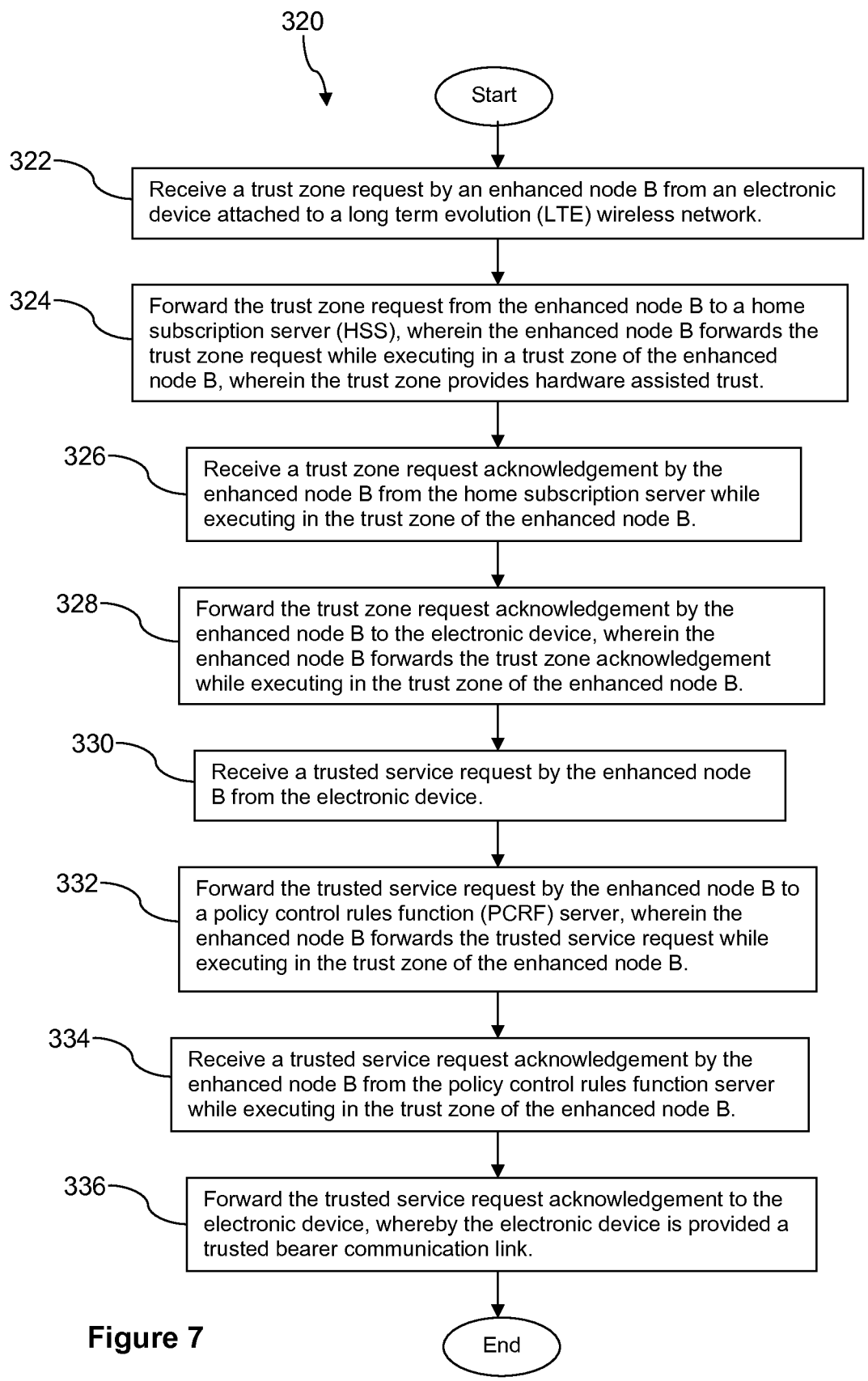
FIG. 7 is a flow chart of a method according to an embodiment of the disclosure.
Figure 8:
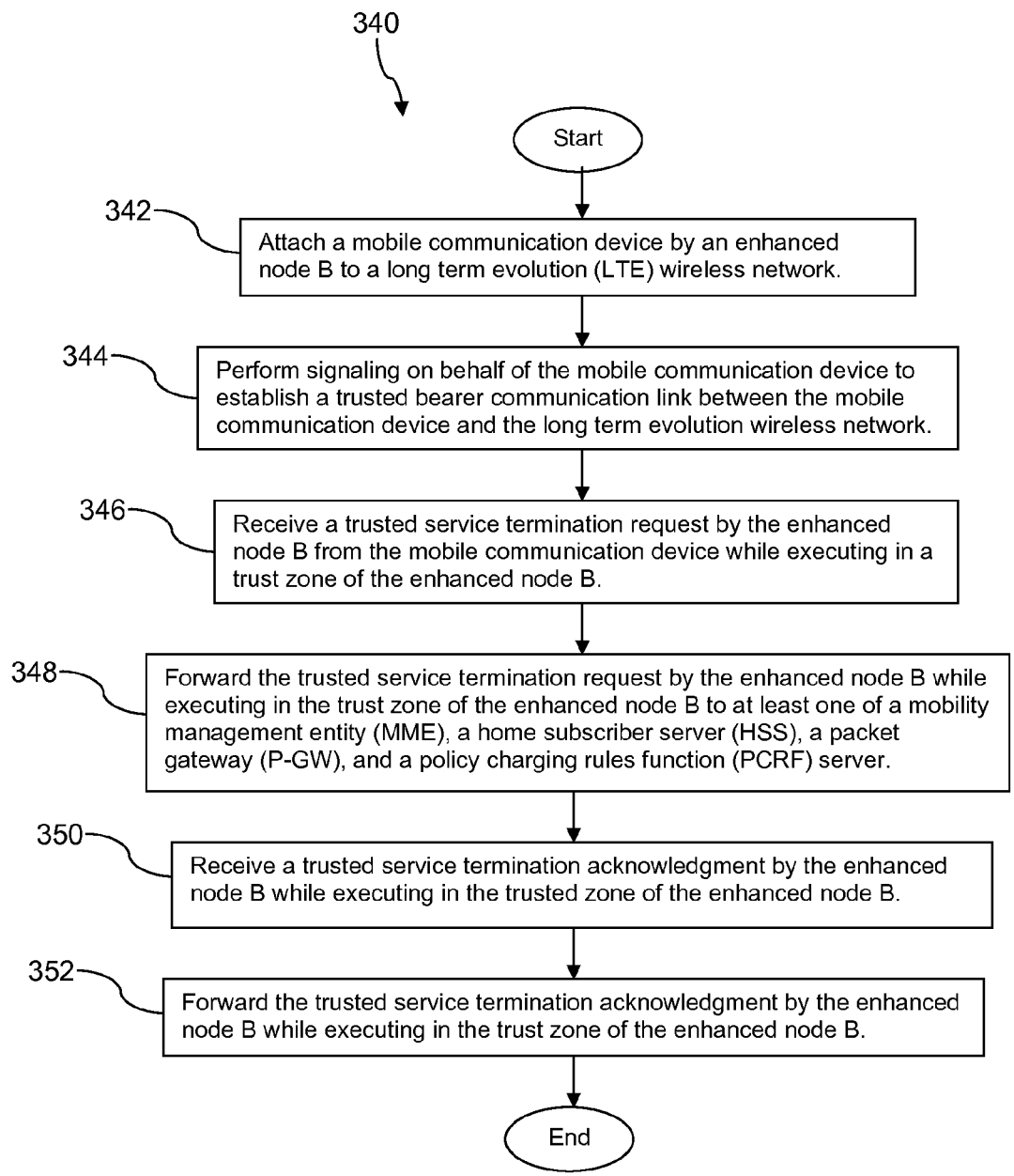
FIG. 8 is a flow chart of another method according to an embodiment of the disclosure.

Turning now to FIG. 7, a method 320 is described. At block 322, a trust zone request is received by an enhanced node B from an electronic device attached to a long term evolution (LTE) wireless network. For example, the enhanced node B 104 receives a trust zone request from the UE 102. At block 324, the trust zone request is forwarded from the enhanced node B to a home subscription server (HSS), wherein the enhanced node B forwards the trust zone request while executing in a trust zone of the enhanced node B, wherein the trust zone provides hardware assisted trust. At block 326, a trust zone request acknowledgement is received by the enhanced node B from the home subscription server while executing in the trust zone of the enhanced node B. At block 328, the trust zone request acknowledgement is forwarded by the enhanced node B to the electronic device, wherein the enhanced node B forwards the trust zone acknowledgement while executing in the trust zone of the enhanced node B. At block 330, a trusted service request is received by the enhanced node B from the electronic device. At block 332, the trusted service request is forwarded by the enhanced node B to a policy control rules function (PCRF) server, wherein the enhanced node B forwards the trusted service request while executing in the trust zone of the enhanced node B. At block 334, a trusted service request acknowledgement is received by the enhanced node B from the policy control rules function server while executing in the trust zone of the enhanced node B. At block 336, the trusted service request acknowledgement is forwarded to the electronic device, whereby the electronic device is provided a trusted bearer communication link Turning now to FIG. 8, a method 340 is described. At block 342, a mobile communication device attaches via an enhanced node B to a long term evolution (LTE) wireless network. For example, the UE 102 attaches via the enhanced node B 104 to a long term evolution wireless network. At block 344, signaling is performed on behalf of the mobile communication device to establish a trusted bearer communication link between the mobile communication device and the long term evolution wireless network. At block 346, a trusted service termination request is received by the enhanced node B from the mobile communication device while executing in a trust zone of the enhanced node B. At block 348, the trusted service termination request is forwarded by the enhanced node B while executing in the trust zone of the enhanced node B to at least one of a mobility management entity (MME), a home subscriber server (HSS), a packet gateway (P-GW), and a policy charging rules function (PCRF) server. At block 350, a trusted service termination acknowledgment is received by the enhanced node B while executing in the trust zone of the enhanced node B. At block 352, the trusted service termination acknowledgment is forwarded by the enhanced node B while executing in the trust zone of the enhanced node B.

Figure 9:
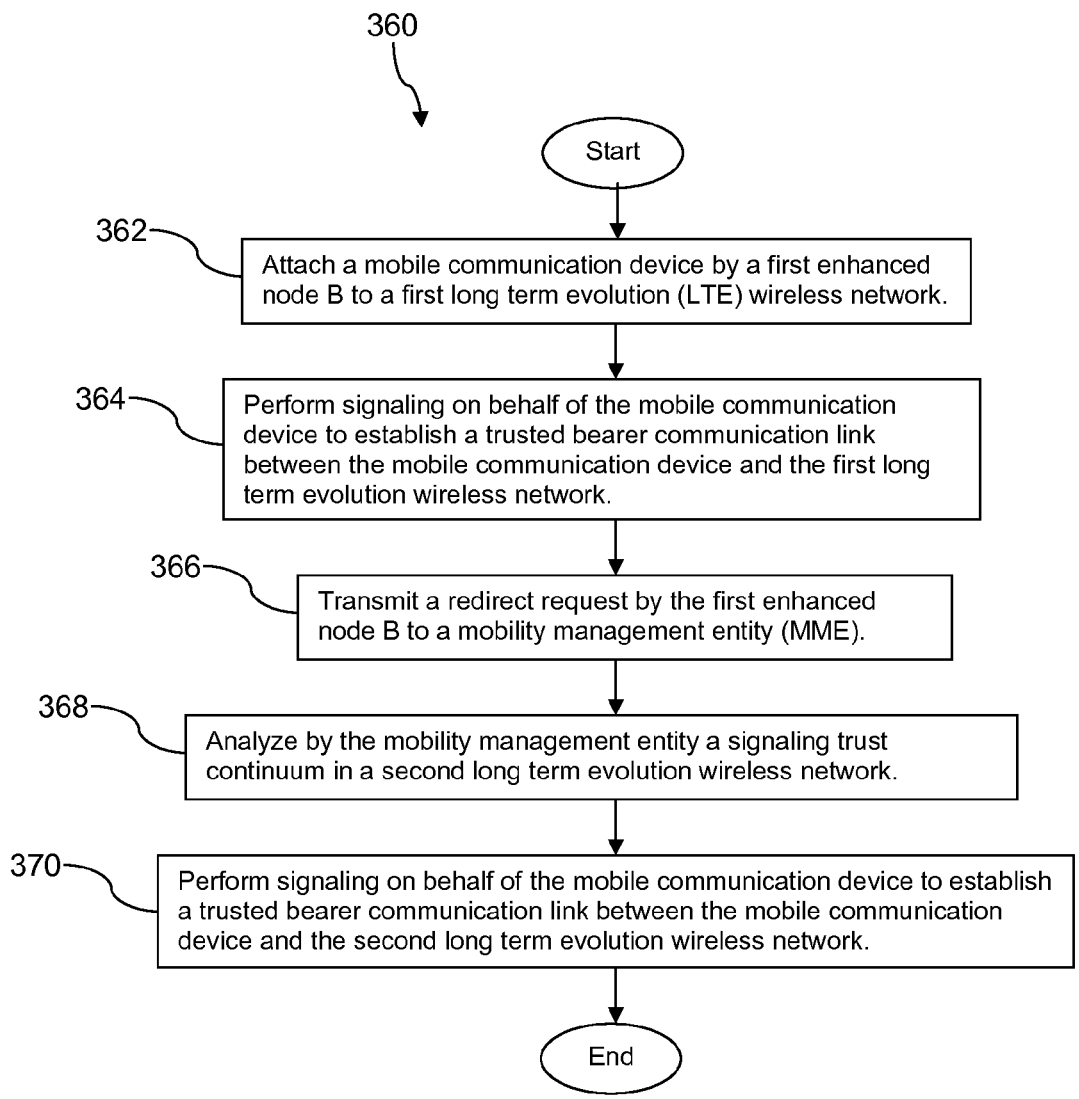
FIG. 9 is a flow chart of another method according to an embodiment of the disclosure.

Turning now to FIG. 9, a method 360 is described. At block 362, a mobile communication device attaches via a first enhanced node B to a first long term evolution (LTE) wireless network. For example the UE 102 attaches via the enhanced node B to a long term evolution wireless network of a first wireless service provider. At block 364, signaling is performed on behalf of the mobile communication device to establish a trusted bearer communication link between the mobile communication device and the first long term evolution wireless network. At block 366, a redirect request is transmitted by the first enhanced node B to a mobility management entity (MME). Alternatively, the mobile communication device may transmit the redirect request. A redirect request may be generated and transmitted, for example, when the mobile communication device roams from a radio access network of the first wireless service provider into the radio access network of a second wireless service provider.

At block 368, the mobility management entity analyzes a signaling trust continuum in a second long term evolution wireless network. At block 370, if the mobility management entity verifies the ability of the second long term evolution wireless network to support a trusted signaling path and/or a trusted bearer path, signaling is performed on behalf of the mobile communication device to establish a trusted bearer communication link between the mobile communication device and the second long term evolution wireless network. In an embodiment, this signaling may comprise forwarding a trust zone request from a second enhanced node B in the second long term evolution wireless network to a home subscription server (HSS) associated with the second long term evolution wireless network, wherein the second enhanced node B forwards the trust zone request while executing in a trust zone of the second enhanced node B and receiving a trust zone request acknowledgement by the second enhanced node B from the home subscription server while executing in the trust zone of the second enhanced node B. This signaling may further comprise forwarding the trust zone request acknowledgement by the second enhanced node B to the mobile communication device, wherein the second enhanced node B forwards the trust zone acknowledgement while executing in the trust zone of the second enhanced node B and receiving a trusted service request by the second enhanced node B from the mobile communication device.

Figure 10:
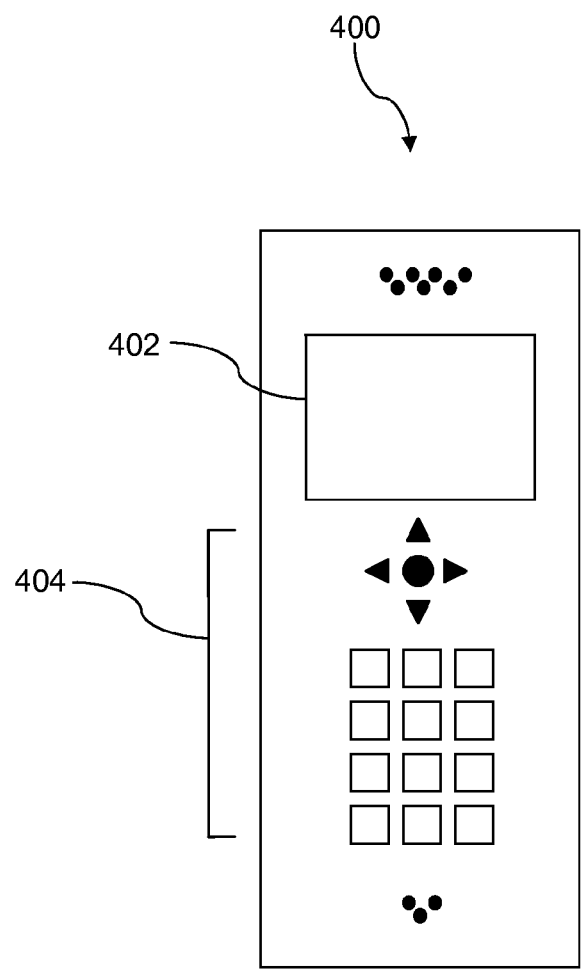
FIG. 10 is an illustration of a handset according to an embodiment of the disclosure.

FIG. 10 depicts the mobile device 400, which is operable for implementing aspects of the present disclosure, but the present disclosure should not be limited to these implementations. Though illustrated as a mobile phone, the mobile device 400 may take various forms including a wireless handset, a pager, a personal digital assistant (PDA), a gaming device, a media player, or a wireless enabled computer, for example a long term evolution wireless enabled computer. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

Figure 11:
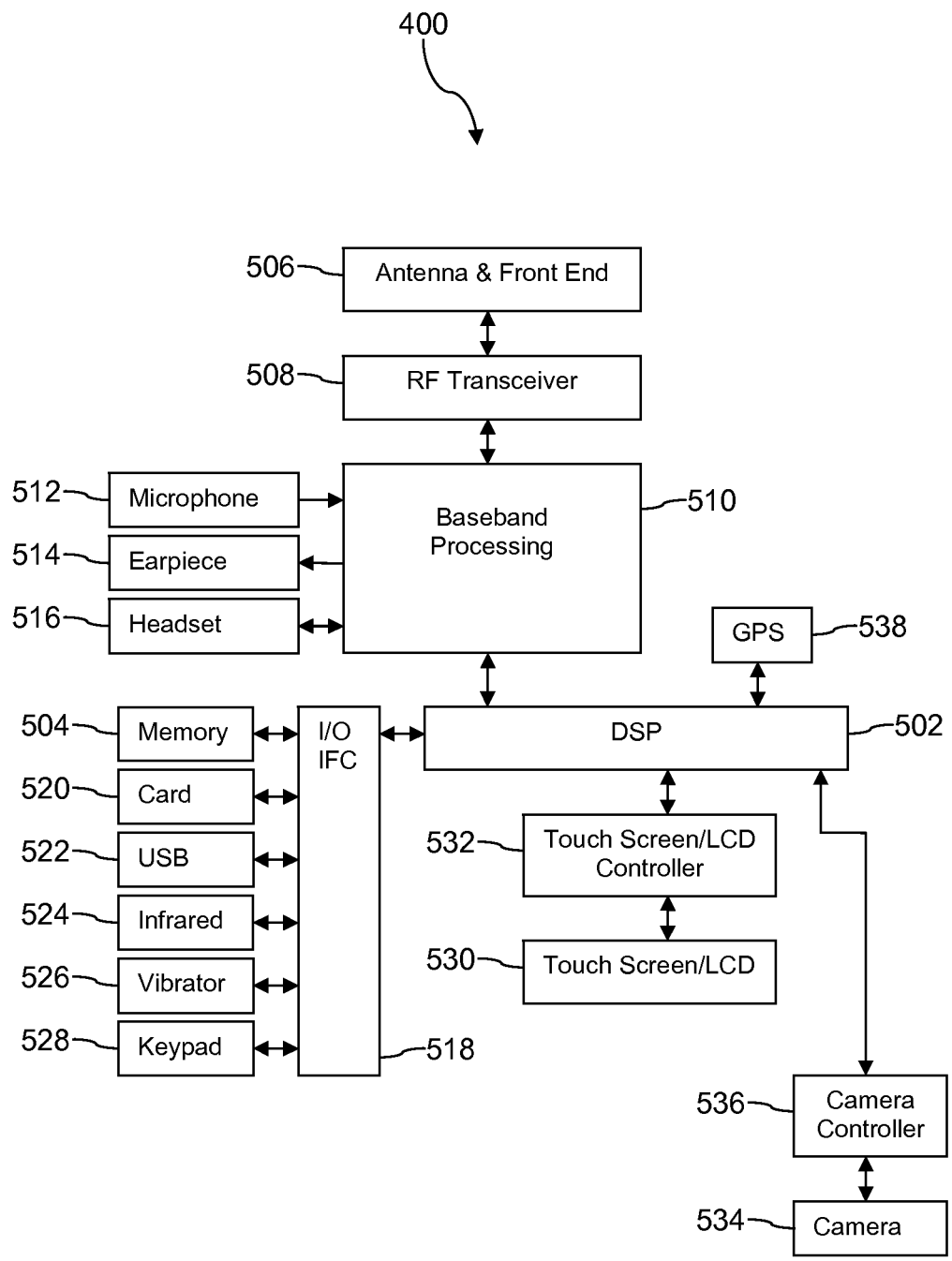
FIG. 11 is a block diagram of a hardware architecture of a handset according to an embodiment of the disclosure.

FIG. 11 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD)

with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth® interface or an IEEE 802.11 compliant wireless interface may enable the mobile device 400 to communicate wirelessly with other nearby handsets and/or wireless base stations.

The keypad 528 couples to the DSP 502 via the interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 12A:
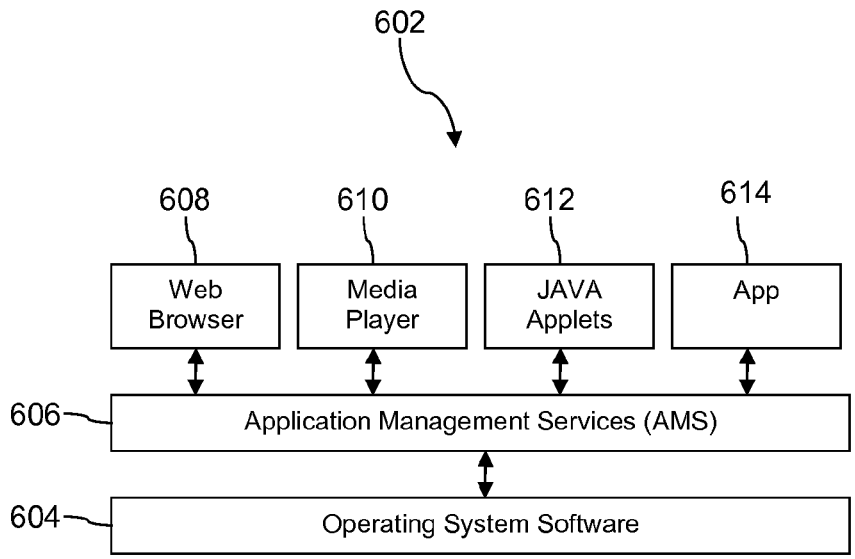
FIG. 12A is block diagram of a software architecture of a handset according to an embodiment of the disclosure.

FIG. 12A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications 614 running on the mobile device 400. Also shown in FIG. 12A are a web browser application 608, a media player application 610, and JAVA applets 612. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality.

Figure 12B:
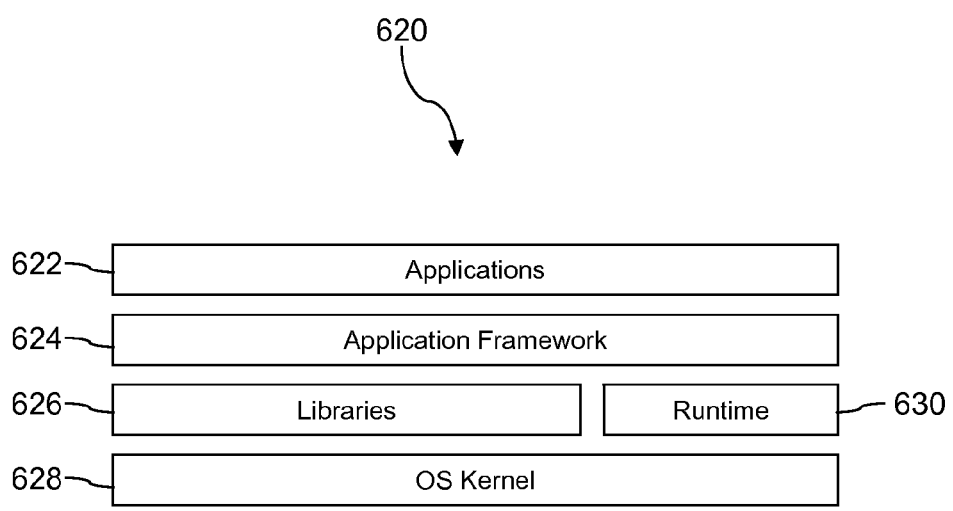
FIG. 12B is a block diagram of another software architecture of a handset according to an embodiment of the disclosure.

FIG. 12B illustrates an alternative software environment 620 that may be implemented by the DSP 502. The DSP 502 executes operating system software 628 (for example an operating system kernel) and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 13:
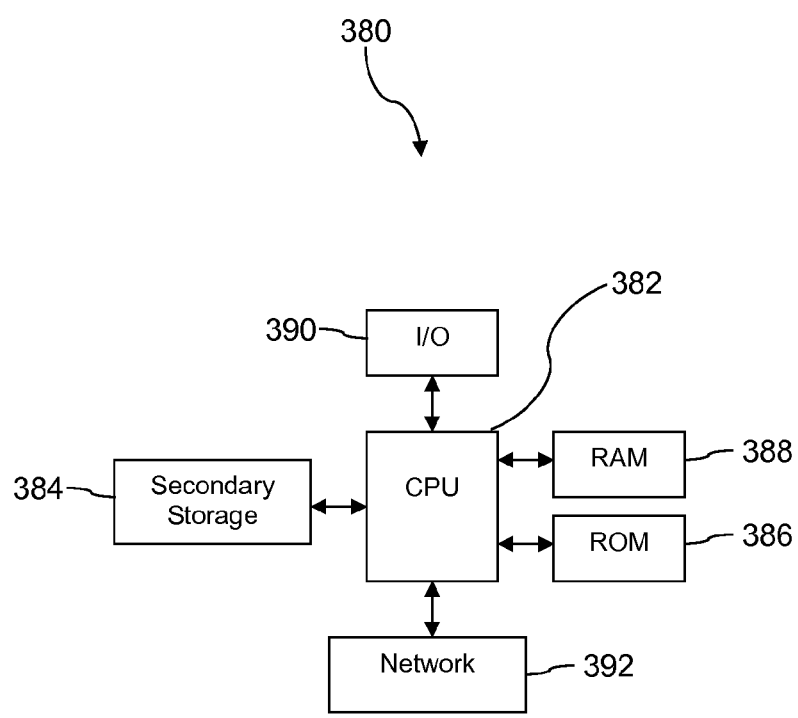
FIG. 13 is a block diagram of a computer system according to an embodiment of the disclosure.

FIG. 13 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of wireless communication enabled by hardware assisted trust, comprising:
    receiving, by an enhanced node B, a trust zone set-up request from an electronic device attached to a long term evolution wireless network;
    forwarding the trust zone set-up request from the enhanced node B to a home subscription server while executing in a trust zone of the enhanced node B, wherein the trust zone provides hardware assisted trust and comprises a secure partition within a subsystem of the enhanced node B, wherein, responsive to the set-up request, the trust zone of the enhanced node B disables execution of components within the subsystem that are outside of the secure partition and the trust zone denies components, that are outside of the trust zone, access to resources in the secure partition;
    receiving, by an enhanced node B, a trust zone set-up confirmation from the home subscription server in response top the trust zone set-up request, and forwarding the trust zone set-up confirmation to the electronic device, wherein the receiving and forwarding of the trust zone setup-confirmation occur while executing in the trust zone of the enhanced node B;
    receiving, by an enhanced node B, a trusted service request from the electronic device after receiving the trust zone setup-confirmation;
    forwarding, by an enhanced node B, the trusted service request to a policy control rules function server while executing in the trust zone of the enhanced node B;
    receiving, by an enhanced node B, a trusted service request authorization from the policy control rules function server, and forwarding the trusted service request authorization to the electronic device, while executing in the trust zone of the enhanced node B; and
    providing a trusted bearer communication link to the electronic device via the enhanced node B in response to the trusted service request.

2. The method of claim 1, wherein the trust zone request authorization comprises a use parameter.

3. The method of claim 2, wherein the use parameter defines a level of access to a trusted network application.

4. The method of claim 2, wherein the use parameter defines a biometric signature.

5. The method of claim 1, wherein the home subscription server confirms that the electronic device has rights to execute a trusted service request before generating the trust zone set-up confirmation.

6. The method of claim 1, wherein the trusted service request identifies a trusted service, and wherein the policy control rules function server confirms that a policy allows the electronic device to invoke the trusted service before generating the trusted service authorization.

7. The method of claim 6, wherein the trusted service request authorization comprises path information for the trusted bearer communication link, wherein the path information is generated by the policy control rules function server.

8. The method of claim 1, further comprising:
    receiving a trusted service termination request by the enhanced node B from the mobile communication device while executing in the trust zone of the enhanced node B;
    forwarding the trusted service termination request by the enhanced node B while executing in the trust zone of the enhanced node B to at least one of the mobility management entity, the home subscriber server, a packet gateway, and the policy control rules function server;
    receiving a trusted service termination acknowledgment by the enhanced node B while executing in the trust zone of the enhanced node B; and
    forwarding the trusted service termination acknowledgment by the enhanced node B while executing in the trust zone of the enhanced node B; and
    taking down the trusted bearer communication link between the electronic device and the long term evolution wireless network via the enhanced node B.

9. The method of claim 8, wherein the trusted bearer communication link provides a trusted network service.

10. The method of claim 9, wherein the trusted network service comprises transmitting a medical report via the trusted bearer communication link.

11. The method of claim 10, wherein the medical report comprises information from a biometric sensor.

12. The method of claim 8, further comprising:
    receiving an untrusted service request by the enhanced node B from the electronic device; and
    forwarding the untrusted service request by the enhanced node B to the mobility management entity.

13. The method of claim 8, wherein the electronic device is one of a mobile phone, a personal data assistant, or a long term evolution wireless enabled computer.

14. The method of claim 8, wherein the trusted bearer communication link promotes trusted network application execution.

15. A method of wireless communication enabled by hardware assisted trust, comprising:
    attaching, via a first enhanced node B, a mobile communication device to a first long term evolution wireless network;
    performing signaling on behalf of the mobile communication device to establish a trusted bearer communication link path between the mobile communication device and the first long term evolution wireless network via the first enhanced node B, wherein the first enhanced node B comprises a trust zone, wherein the trust zone provides hardware assisted trust;
    establishing the trusted bearer communication path via the first enhanced node B, wherein the trusted bearer communication path comprises a plurality of network elements in signal communication with each other, wherein each network element along the trusted bearer communication path is associated with a corresponding trust zone, wherein, responsive to signaling, each corresponding trust zone along a respective trusted bearer communication path disables execution of at least some components that are outside of each corresponding trust zone, and denies components, that are outside of the trust zone, access to resources in a secure partition of each corresponding trust zone;

transmitting, via the first enhanced node B, a redirect request to a mobility management entity;

analyzing, by the mobility management entity, a second long term evolution wireless network to verify an ability to support a second trusted bearer communication path; and performing signaling on behalf of the mobile communication device to establish the second trusted bearer communication link between the mobile communication device and the second long term evolution wireless network after analyzing the second long term evolution wireless network.

16. The method of claim 15, wherein the mobile communication device is one of a mobile phone, a personal data assistant, or a long term evolution wireless enabled computer.

17. The method of claim 15, wherein the redirect request is transmitted pursuant to the mobile communication device roaming from the first long term evolution wireless network to the second long term evolution wireless network.

18. The method of claim 15, wherein the first long term evolution wireless network is operated by a first wireless service provider and the second long term evolution wireless network is operated by a second wireless service provider.

19. The method of claim 15, forwarding a trust zone request from a second enhanced node B to a home subscription server associated with the second long term evolution wireless network, wherein the second enhanced node B forwards the trust zone request while executing in a trust zone of the second enhanced node B, wherein the trust zone provides hardware assisted trust;

receiving a trust zone request acknowledgement by the second enhanced node B from the home subscription server while executing in the trust zone of the second enhanced node B.

20. The method of claim 19, further comprising forwarding the trust zone request acknowledgement by the second enhanced node B to the electronic device, wherein the second enhanced node B forwards the trust zone acknowledgement while executing in the trust zone of the second enhanced node B;

receiving a trusted service request by the second enhanced node B from the electronic device;

forwarding the trusted service request by the second enhanced node B to a policy control rules function server associated with the second long term evolution wireless network, wherein the second enhanced node B forwards the trusted service request while executing in the trust zone of the second enhanced node B;

receiving a trusted service request acknowledgement by the second enhanced node B from the policy control rules function server while executing in the trust zone of the second enhanced node B; and forwarding, via the second enhanced node B, the trusted service request acknowledgement to the electronic device; and providing a trusted bearer communication path via the second long term evolution wireless network.

* * * * *